(12) United States Patent
Sugiyama

(10) Patent No.: US 7,589,810 B2
(45) Date of Patent: Sep. 15, 2009

(54) ELECTROOPTIC DEVICE, ELECTRONIC APPARATUS, AND DRIVING METHOD FOR THE ELECTROOPTIC DEVICE

(75) Inventor: Nobuo Sugiyama, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 12/014,619

(22) Filed: Jan. 15, 2008

(65) Prior Publication Data

US 2008/0170183 A1 Jul. 17, 2008

(30) Foreign Application Priority Data

Jan. 16, 2007 (JP) .............................. 2007-006675

(51) Int. Cl.
*G02F 1/1335* (2006.01)
(52) U.S. Cl. .............................. 349/117; 349/56; 349/84
(58) Field of Classification Search .................. 349/56, 349/84, 117
See application file for complete search history.

(56) References Cited

U.S. PATENT DOCUMENTS 5,646,713 A * 7/1997 Powers et al. .................. 355/40

7,466,499 B2 * 12/2008 Takeuchi et al. ............ 359/738

FOREIGN PATENT DOCUMENTS

JP 03-119889 5/1991

* cited by examiner

*Primary Examiner*—Jennifer Doan
(74) *Attorney, Agent, or Firm*—Workman Nydegger

(57) ABSTRACT

An electrooptic device simultaneously displays a first image and a second image in different directions. The electrooptic device includes a first polarizer and pixel rows in which first and second pixels are alternately arranged to emit light through the first polarizer. The electrooptic device includes a liquid crystal device that switches between a first alignment state in which a phase difference is not provided to linearly polarized light having a polarization axis parallel or perpendicular to a transmission axis of the first polarizer and a second alignment state with a phase difference of λ/2. The electrooptic device also includes a second polarizer disposed on a display side of the liquid crystal device and having a transmission axis parallel or perpendicular to the transmission axis of the first polarizer. The first and second pixels display different images depending on the alignment state of the liquid crystal device.

12 Claims, 18 Drawing Sheets

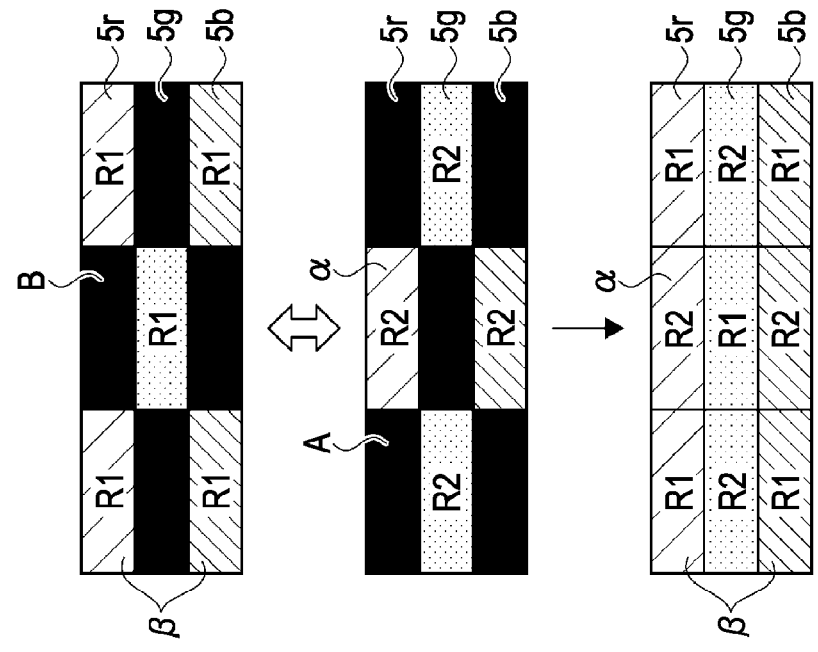

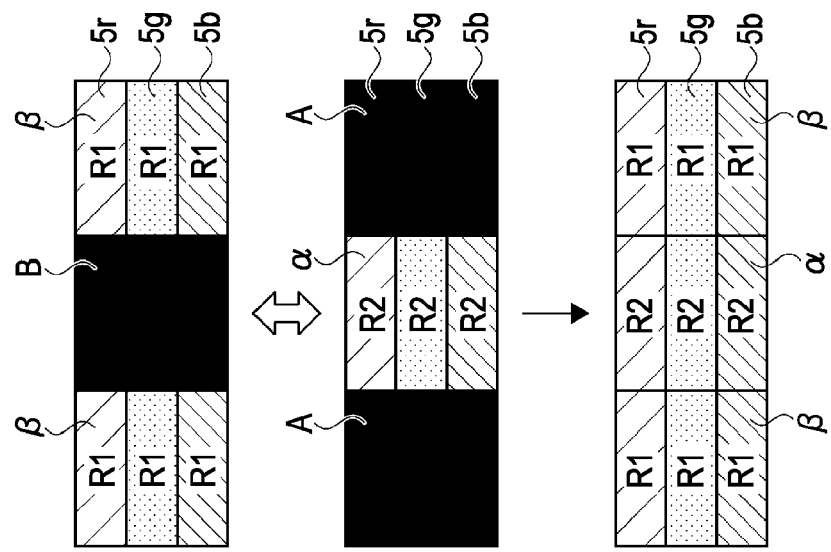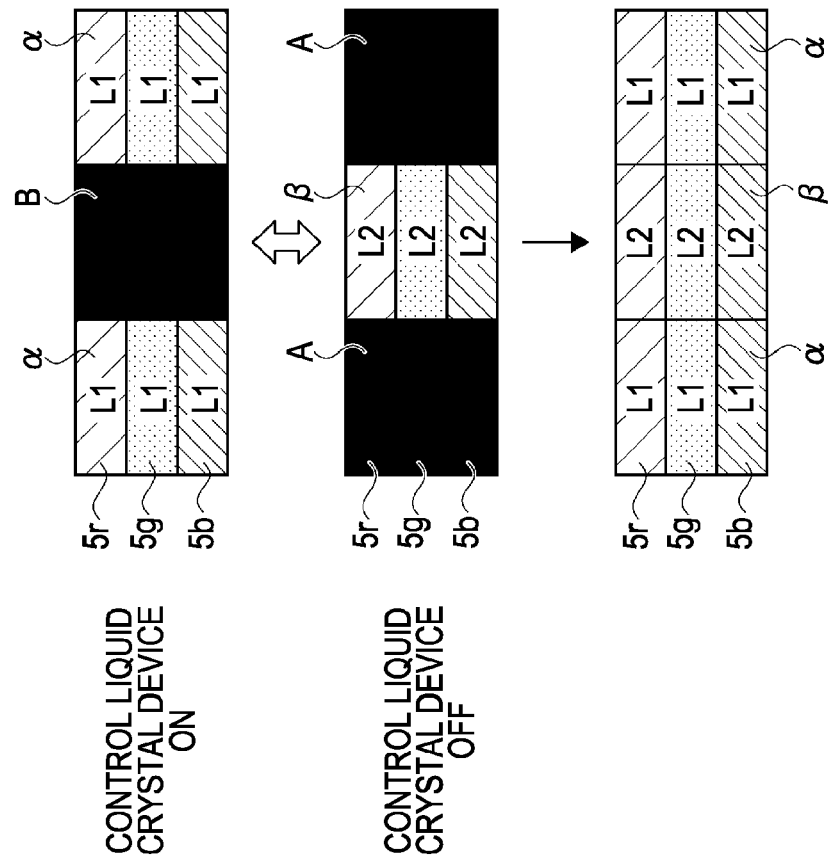

ELECTROOPTIC DEVICE, ELECTRONIC APPARATUS, AND DRIVING METHOD FOR THE ELECTROOPTIC DEVICE

BACKGROUND

1. Technical Field

The present invention relates to an electrooptic device and an electronic apparatus that can simultaneously display two different images in different directions, and a driving method for the electrooptic device.

2. Related Art

It is known that two images can be simultaneously displayed in different directions by placing a barrier mask substrate, which includes a barrier layer (parallax barrier) having apertures, on a surface of an electrooptic device with a fixed space therebetween. This display utilizes the principle that different pixels are shielded by the parallax barrier when the viewing angle changes. Japanese Patent No. 2,857,429 discloses a three-dimensional image display device that can perform three-dimensional display with two images displayed in different directions.

Further, the display directions of the two images can be made widely different by decreasing the distance between display pixels and the parallax barrier. For example, this allows different viewers to individually view the two images from the oblique right and left directions.

In the above-described display device, however, pixels shielded by the parallax barrier at a certain viewing angle do not contribute to display at that viewing angle. Therefore, the resolution of two images displayed in the different directions is lower than the original display resolution of the electrooptic device.

SUMMARY

An advantage of some aspects of the invention is that different images can be simultaneously displayed in different directions without reducing the resolution.

An electrooptic device according to an aspect of the invention simultaneously displays a first image and a second image in different directions. The electrooptic device includes an electrooptic panel including a first polarizer and a plurality of pixel rows in which first and second pixels are alternately arranged, and configured to emit light through the first polarizer; a retardation film disposed on a display side of the first polarizer; a liquid crystal device disposed on a display side of the retardation film and configured to switch between a first alignment state in which a phase difference is not provided to linearly polarized light having a polarization axis parallel or perpendicular to a transmission axis of the first polarizer and a second alignment state in which a phase difference of $\lambda/2$ is provided to the linearly polarized light; and a second polarizer disposed on a display side of the liquid crystal device and having a transmission axis parallel or perpendicular to the transmission axis of the first polarizer. The retardation film includes first regions having a slow axis parallel or perpendicular to the transmission axis of the first polarizer and having a retardation of $\lambda/2$, and second regions having a slow axis at a relative angle of 45° to the transmission axis of the first polarizer and having a retardation of $\lambda/2$. The first regions and the second regions are alternately arranged along the pixel rows while being shifted by half of an arrangement pitch of the first and second pixels with respect to the first and second pixels, as viewed in the normal direction of the electrooptic panel. The first pixels display the first image when the liquid crystal layer is in the first alignment state, and display the second image when the liquid crystal layer is in the second alignment state. The second pixels display the second image when the liquid crystal layer is in the first alignment state, and display the first image when the liquid crystal layer is in the second alignment state.

When the transmission axis of the first polarizer is parallel to the transmission axis of the second polarizer, the electrooptic device operates as follows by the action of the retardation film, the liquid crystal layer, and the second polarizer. First, when the liquid crystal layer is in the first alignment state, light passing through the first polarizer passes through the second polarizer in portions corresponding to the first regions, and is shielded by the second polarizer in portions corresponding to the second regions. In this case, when the viewing angle is tilted from the normal direction of the electrooptic panel in a certain direction along the pixel rows, the first image displayed by the first pixels is viewed. When the viewing angle is tilted in the opposite direction, the second image displayed by the second pixels is viewed. In contrast, when the liquid crystal layer is in the second alignment state, light passing through the first polarizer is shielded by the second polarizer in portions corresponding to the first regions, and passes through the second polarizer in portions corresponding to the second regions. In this case, when the viewing angle is tilted in the above certain direction, the first image displayed by the second pixels is visible. When the viewing angle is tilted in the opposite direction, the second image displayed by the first pixels is visible. In this way, the first regions and the second regions function as a parallax barrier in accordance with the alignment state of the liquid crystal layer. In any case, the first image is viewed when the viewing angle is tilted in a certain direction, and the second image is viewed when the viewing angle is tilted in the opposite direction. With this configuration, the first pixels and the second pixels contribute to both display of the first image and display of the second image. Therefore, different images can be displayed in different directions without reducing the resolution. When the transmission axis of the first polarizer is perpendicular to the transmission axis of the second polarizer, the transmission region and the shielding region are reversed. In this case, different images can also be simultaneously displayed in different directions without reducing the resolution, by the operation similar to the above.

In the electrooptic device, the first regions and the second regions may be alternately arranged in a direction orthogonal to the pixel rows. In this case, the first regions and the second regions are arranged in an oblong checkered pattern (a mosaic pattern). This allows a mosaic-shaped parallax barrier (step barrier) to be formed at the retardation film in accordance with the alignment state of the liquid crystal layer. Consequently, when the liquid crystal layer is in a certain alignment state, it is possible to prevent reduction in the resolution of the display of the first image and the display of the second image. Therefore, a high-quality two-screen display can be performed even when the switching frequency of the alignment state of the liquid crystal layer is low.

Each of the first regions and the second regions may be connected in a direction orthogonal to the pixel rows. In this case, the first regions and the second regions are arranged in stripes. For this reason, the area of each connected unit of the first regions and the second regions in the retardation film is increased, and variations in retardation in the same region can be reduced. Moreover, changes in phase difference near the boundaries between the first regions and the second regions can be reduced. Consequently, a high-quality two-screen display can be performed.

Preferably, the electrooptic panel includes a first substrate; a second substrate disposed on a display side of the first substrate; and an electrooptic substance provided between the first substrate and the second substrate. Preferably, the first polarizer is disposed on a surface of the second substrate facing the electrooptic substance. This structure can reduce the distance between the first and second pixels of the electrooptic panel and the retardation film. Consequently, it is possible to increase the relative angle between the viewing angle at which the first image is viewed and the angle at which the second image is viewed, and to obtain a highly visible electrooptic device.

Preferably, the retardation film is provided between the second substrate and the first polarizer. This structure can further reduce the distance between the first and second pixels of the electrooptic panel and the retardation film. Consequently, it is possible to further increase the relative angle between the angles at which the first image and the second image are viewed, and to obtain a highly visible electrooptic device. Further, since the second substrate also functions as a substrate that forms the retardation film, the number of substrates can be reduced, and the thickness of the electrooptic device can be reduced.

An electronic apparatus according to another aspect of the invention includes the above-described electrooptic device in a display section. This allows the electronic apparatus to simultaneously display different images in different directions without reducing the resolution.

An electrooptic-device driving method according to a further aspect of the invention drives an electrooptic device that simultaneously displays a first image and a second image in different directions. The electrooptic device includes an electrooptic panel including a first polarizer and a plurality of pixel rows in which first and second pixels are alternately arranged, and configured to emit light through the first polarizer; a retardation film disposed on a display side of the first polarizer; a liquid crystal device disposed on a display side of the retardation film and configured to switch between a first alignment state in which a phase difference is not provided to linearly polarized light having a polarization axis parallel or perpendicular to a transmission axis of the first polarizer and a second alignment state in which a phase difference of $\lambda/2$ is provided to the linearly polarized light; and a second polarizer disposed on a display side of the liquid crystal device and having a transmission axis parallel or perpendicular to the transmission axis of the first polarizer. The retardation film includes first regions having a slow axis parallel or perpendicular to the transmission axis of the first polarizer and having a retardation of $\lambda/2$, and second regions having a slow axis at a relative angle of 45° to the transmission axis of the first polarizer and having a retardation of $\lambda/2$. The first regions and the second regions are alternately arranged along the pixel rows while being shifted by half of an arrangement pitch of the first and second pixels with respect to the first and second pixels, as viewed in the normal direction of the electrooptic panel. The driving method repeats, at a fixed frequency, a first state in which the liquid crystal layer is in a first alignment state, the first image is displayed by the first pixels, and the second image is displayed by the second pixels and a second state in which the liquid crystal layer is in a second alignment state, the second image is displayed by the first pixels, and the first image is displayed by the second pixels.

When the transmission axis of the first polarizer is parallel to the transmission axis of the second polarizer, the electrooptic device operates as follows by the action of the retardation film, the liquid crystal layer, and the second polarizer. First, in the first state, the liquid crystal layer is in the first alignment state, and light passing through the first polarizer passes through the second polarizer in portions corresponding to the first regions, and is shielded by the second polarizer in portion corresponding to the second regions. In this case, when the viewing angle is tilted from the normal direction of the electrooptic panel in a certain direction along the pixel rows, the first image displayed by the first pixels is viewed. When the viewing angle is tilted in the opposite direction, the second image displayed by the second pixels is viewed. In contrast, in the second state, the liquid crystal layer is in the second alignment state, and light passing through the first polarizer is shielded by the second polarizer in portions corresponding to the first regions, and passes through the second polarizer in portions corresponding to the second regions. In this case, when the viewing angle is tilted in the above certain direction, the first image displayed by the second pixels is viewed. When the viewing angle is tilted in the opposite direction, the second image displayed by the first pixels is viewed. In this way, the first regions and the second regions function as a parallax barrier in accordance with the alignment state of the liquid crystal layer. In any case, the first image is viewed when the viewing angle is tilted in a certain direction, and the second image is viewed when the viewing angle is tilted in the opposite direction. By repeating these two states, that is, the first state and the second state at a fixed frequency, the viewer visually recognizes as if both the first and second pixels display the first image when the viewing angle is tilted in a certain direction, and as if both the first and second pixels display the second image when the viewing angle is tilted in the opposite direction. Therefore, in the above-described driving method, the first pixels and the second pixels contribute to both display of the first image and display of the second image. This allows different images to be simultaneously displayed in different directions without reducing the resolution. When the transmission axis of the first polarizer is perpendicular to the transmission axis of the second polarizer, the transmission region and the shielding region are reversed. In this case, different images can also be simultaneously displayed in different directions without reducing the resolution, by the operation similar to the above.

In the driving method, preferably, the frequency is double an apparent frame frequency in the display of the first image and the second image performed by the electrooptic device. According to this method, different images can be simultaneously displayed in different directions without reducing the resolution while maintaining the display frame frequency of the electrooptic device.

BRIEF DESCRIPTION OF THE DRAWINGS

The invention will be described with reference to the accompanying drawings, wherein like numbers reference like elements.

FIG. 4A is a schematic view showing a polarization state of display light passing through portions corresponding to regions A and B of the patterned retardation film when a control liquid crystal device is on.

FIG. 6A is a schematic plan view showing a display of the liquid crystal display device when the control liquid crystal device is on.

FIGS. 8A and 8B are explanatory views showing displays viewed when the control liquid crystal device is switched.

FIG. 11A is a schematic view showing a shape of a parallax barrier provided at the patterned retardation film when a control liquid crystal device is on.

FIG. 12A is a schematic plan view showing a display of a liquid crystal display device when the control liquid crystal device is on.

FIG. 13A is a schematic plan view showing a display of the liquid crystal display device when the control liquid crystal device is on.

FIGS. 14A and 14B are explanatory views showing displays viewed when the control liquid crystal device is switched.

DESCRIPTION OF EXEMPLARY EMBODIMENTS

Figure 1:
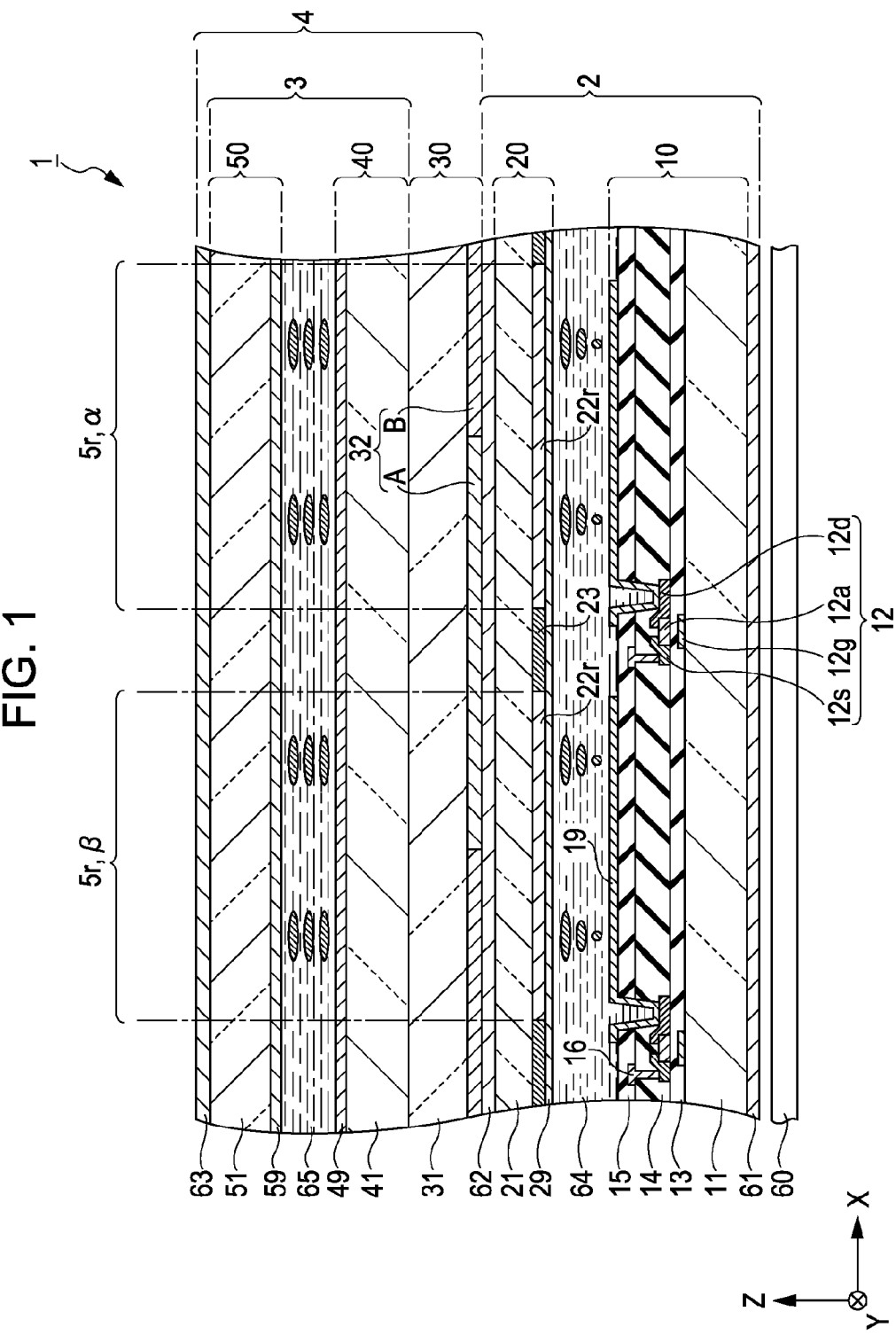
FIG. 1 is a cross-sectional view of a liquid crystal display device serving as an electrooptic device according to a first exemplary embodiment of the invention.

Exemplary embodiments of the invention will be described below with reference to the drawings. In the drawings, the dimensions and ratios of the components are appropriately made different from actual ones so that the components have sizes such as to be viewable in the drawings.

First Exemplary Embodiment

A. Electrooptic Device

FIG. 1 is a cross-sectional view of a liquid crystal display device 1 serving as an electrooptic device according to a first exemplary embodiment of the invention. In the liquid crystal display device 1, a backlight 60, a liquid crystal panel 2 serving as an electrooptic panel, a retardation substrate 30, a control liquid crystal device 3 serving as a liquid crystal device, and a polarizer 63 serving as a second polarizer are stacked in that order. The retardation substrate 30, the control liquid crystal device 3, and the polarizer 63 constitute a barrier mask 4. The components will be sequentially described in detail below.

The backlight 60 is a surface light source such as an LED (light emitting diode), and principally emits light in the +Z-direction in FIG. 1. Light passing through the liquid crystal panel 2 and the barrier mask 4, of the light from the backlight 60, allows the viewer to view a display. In the following description, a +Z-direction side of a component will also be referred to as a display side, and a −Z-direction side will also be referred to as a back side.

The liquid crystal panel 2 includes an element substrate 10 and a counter substrate 20 opposing each other. A TN (twisted nematic) mode liquid crystal layer 64 is sealed between the element substrate 10 and the counter substrate 20. The liquid crystal layer 64 corresponds to an electrooptic substance in the invention. A polarizer 61 is provided on the back side of the element substrate 10, and a polarizer 62 serving as a first polarizer is provided on the display side of the counter substrate 20.

Figure 2A:
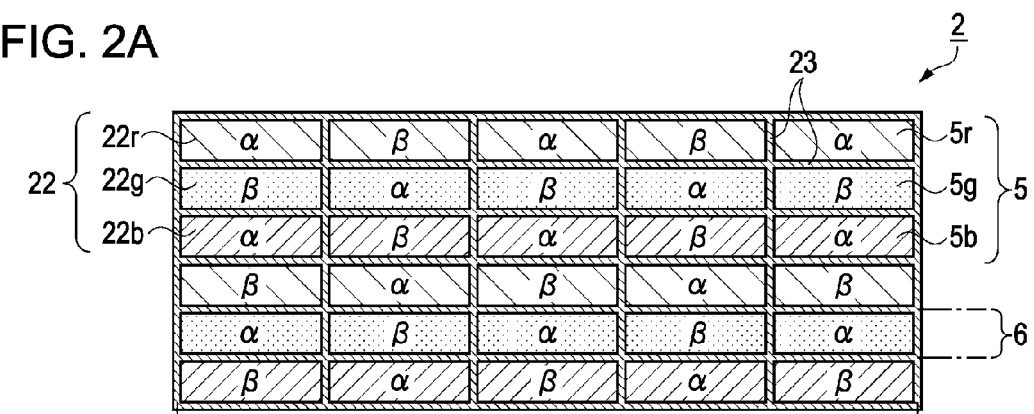
FIG. 2A is a plan view of a liquid crystal panel, as viewed from a display side.

FIG. 2A is a plan view of the liquid crystal panel 2, as viewed from the display side. The liquid crystal panel 2 includes pixels 5r, 5g, and 5b (hereinafter also generically referred to as pixels 5). The pixels 5r, 5g, and 5b respectively have red, green, and blue color filters 22r, 22g, and 22b (hereinafter also generically referred to as color filters 22), and perform red, green, and blue displays. The pixels 5r, 5g, and 5b are alternately arranged in that order in the Y-axis direction. In the X-axis direction, pixels 5 of the same color are arranged to form a stripe. Light-shielding layers 23 formed of black resin are provided between the adjacent pixels 5.

The pixels 5 are divided into a pixel α serving as a first pixel and a pixel β serving as a second pixels in the invention. The pixels α and β are alternately arranged in the X-axis direction. A row of pixels 5 extending in the X-axis direction is referred to as a pixel row 6. In the first exemplary embodiment, the pixels α and β are also alternately arranged in the Y-axis direction. Therefore, the pixels α and β are arranged in an oblong checkered pattern (a mosaic pattern).

Referring again to FIG. 1, structures of the element substrate 10 and the counter substrate 20 will be described. The element substrate 20 is a so-called TFT element substrate. On a glass substrate 11 of the element substrate 11, TFT (thin film transistor) elements 12 serving as switching elements provided corresponding to the respective pixels 5, scanning lines 71 (FIG. 3) and data lines 16 connected to the TFT elements 12, and pixel electrodes 19 are provided. The glass substrate 11 corresponds to a first substrate in the invention. First to fourth layers are stacked on a surface of the glass substrate 11 facing the liquid crystal layer 64. In order to prevent a short circuit between the components provided on the layers, an interlayer insulating layer 13 is provided between the first layer and the second layer, an interlayer insulating layer 14 is provided between the second layer and the third layer, and an interlayer insulating layer 15 is provided between the third layer and the fourth layer. While the TFT elements 12 are of a three-terminal type in the first exemplary embodiment, they can be replaced with two-terminal TFD (thin film diode) elements.

Gate electrodes 12g of the TFT elements 12 are provided in the first layer disposed on the surface of the glass substrate 11. The second layer is provided on the first layer such that the interlayer insulating layer 13 formed of $SiO_2$ or the like is disposed therebetween. Semiconductor layers 12a of amorphous silicon are provided in the second layer and above the gate electrodes 12g. Source electrodes 12s are provided in source regions of the semiconductor layers 12a, and drain electrodes 12d are provided in drain regions of the semiconductor layers 12a. The source electrodes 12s and the drain electrodes 12d overlap with each other. The source electrodes 12s are connected to the data lines 16, and the drain electrodes 12d are connected to the pixel electrodes 19. Each TFT element 12 is constituted by a semiconductor layer 12a, a source electrode 12s, a drain electrode 12d, and a gate electrode 12g.

The third layer is provided on the second layer such that the interlayer insulating layer 14 formed of, for example, $SiO_2$ is disposed therebetween. The data lines 16 are provided in the third layer. The fourth layer is provided on the third layer such that the interlayer insulating layer 15 formed of, for example, $SiO_2$ is disposed therebetween. In the fourth layer, light-transmissive pixel electrodes 19 formed of ITO (indium tin oxide) are provided. The pixel electrodes 19 are connected to the drain electrodes 12d of the TFT elements 12 via contact holes provided through the interlayer insulating layers 14 and 15. An alignment film formed of polyimide (not shown) is provided on a surface of the fourth layer.

The counter substrate 20 is a so-called color filter substrate in which the color filters 22 are provided on a glass substrate 21. The glass substrate 21 corresponds to a second substrate in the invention. The red, green, and blue color filters 22r, 22g, and 22b (FIG. 2A) are provided corresponding to the respective pixels 5r, 5g, and 5b on a surface of the glass substrate 21 facing the liquid crystal layer 64. The color filters 22 are formed of a resin that absorbs a component of incident light having a specific wavelength. Light can have predetermined colors by passing through the color filters 22 (e.g., red, green, and blue). The light-shielding layers 23 formed of a light-shielding black resin are provided between the adjacent pixels 5. A counter electrode 29 formed of ITO is provided on surfaces of the color filters 22 and the light-shielding layers 23. An alignment film (not shown) formed of polyimide is provided on the counter electrode 29. An overcoat formed of a light-transmissive resin can also be provided on the color filters 22 and the light-shielding layers 23, and the counter electrode 29 and the alignment film can be provided on the overcoat.

The glass substrate 21 is polished to a thickness of about 50 μm by chemical etching or CMP (chemical mechanical polishing). This polishing adjusts the distance between the color filters 22, from which display light is substantially emitted, and a patterned retardation film 32 that will be described below.

Figure 3:
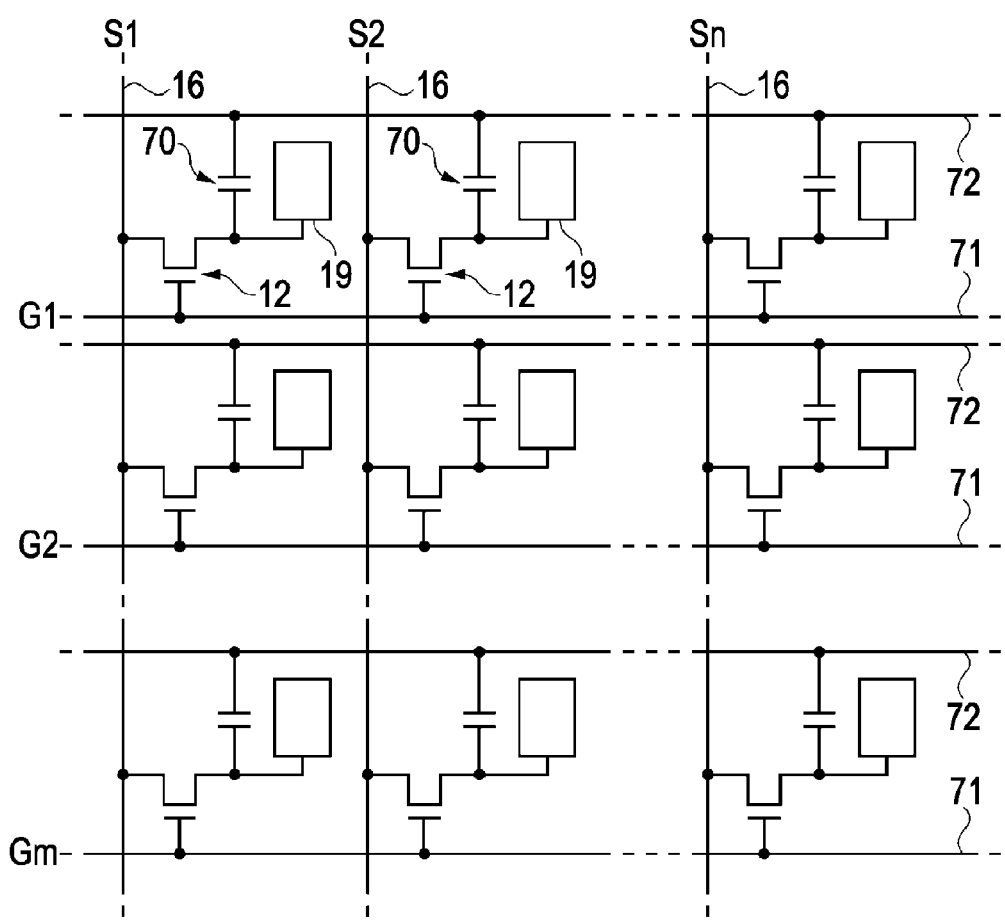
FIG. 3 is a schematic view showing an electrical configuration of the liquid crystal panel.

FIG. 3 is a schematic view showing an electrical configuration of the liquid crystal panel 2. As shown in FIG. 3, a plurality of scanning lines 71 and a plurality of data lines 16 intersect each other in a pixel region. In regions defined by the scanning lines 71 and the data lines 16, the pixel electrodes 19 are arranged in a matrix. The TFT elements 12 are provided at the intersections of the scanning lines 71 and the data lines 16, and are connected to the pixel electrodes 19.

The TFT elements 12 are turned on by ON signals included in scanning signals G1, G2, . . . , Gm supplied from the scanning lines 71. In this case, image signals S1, S2, . . . , Sn supplied to the data lines 16 are supplied to the pixel electrodes 19. Voltages between the pixel electrodes 19 and the counter electrode 29 (FIG. 1) are applied to the liquid crystal layer 64. Storage capacitors 70 are provided parallel to the pixel electrodes 19 and between the pixel electrodes 19 and capacity lines 72. The storage capacitors 70 allow the voltages of the pixel electrodes 19 to be held, for example, for a period that is three orders of magnitude longer than the period for which the image signal is applied. When the voltage holding characteristic is thus improved, the display contrast ratio is increased.

When a driving voltage is applied between a pixel electrode 19 and the counter electrode 29, an electric field is produced in the liquid crystal layer 64. Liquid crystal molecules in the liquid crystal layer 64 change their alignment direction in accordance with the electric field. The liquid crystal panel 2 performs display with a polarization converting function in accordance with the alignment direction of the liquid crystal molecules in the liquid crystal layer 64. Display light is emitted to the display side via the polarizer 62.

While the scanning lines 71 extend in the horizontal direction and the data lines 16 extend in the vertical direction in FIG. 3, in the liquid crystal display device 1 shown in FIG. 1, the scanning lines 71 may extend along the X-axis and the data lines 16 may extend along the Y-axis. Alternatively, the scanning lines 71 may extend along the Y-axis, and the data lines 16 may extend along the X-axis.

Referring again to FIG. 1, the retardation substrate 30 is provided on the display side of the liquid crystal panel 2. The retardation substrate 30 includes a glass substrate 31, and a patterned retardation film 32 provided on the back side of the glass substrate 31 and serving as a retardation film in the invention.

Figure 2B:
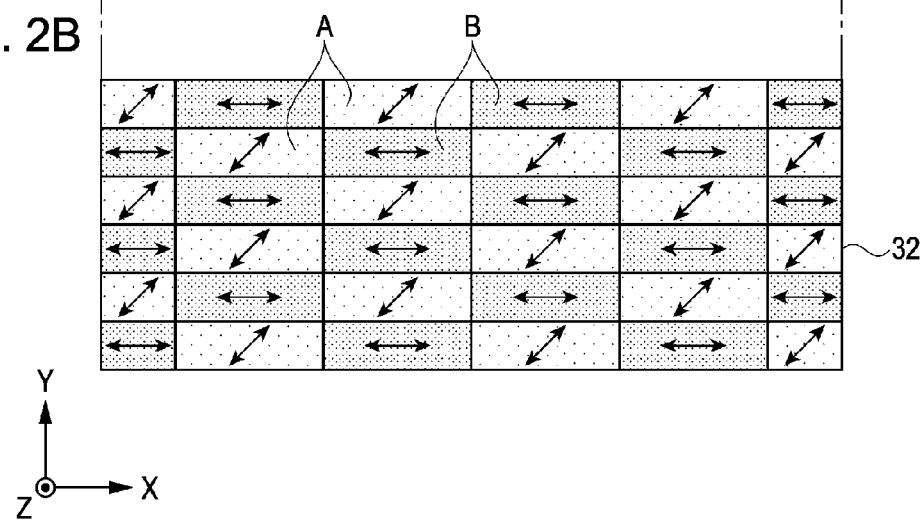
FIG. 2B is a plan view of a patterned retardation film, as viewed from the display side.

FIG. 2B is a plan view of the patterned retardation film 32, as viewed from the display side, and shows a section that coincides with the liquid crystal panel 2 shown in FIG. 2A, as viewed from the display side. As shown in FIG. 2B, the patterned retardation film 32 includes regions A and regions B alternately arranged along the pixel rows 6, as viewed from the normal direction (+Z-direction) of the liquid crystal panel 2. The regions A and B are shaped like a rectangle having the same size as that of the pixels 5. In the Y-axis direction, the regions A and B are arranged just on the pixel rows 6. In the X-axis direction, the regions A and B are alternately arranged so as to be shifted by half of the arrangement pitch of the pixels α and pixels β with respect to the pixels α and pixels β. More specifically, each region A is provided on the left half of a pixel α and the right half of a pixel β. Each region B is provided on the left half of a pixel β and the right half of a pixel α. Therefore, the regions A and B are alternately arranged not only in the X-axis direction, but also in the Y-axis direction, similarly to the pixels α and β. That is, the regions A and B are arranged in an oblong checkered pattern (a mosaic pattern).

Arrows in FIG. 2B represent slow axes of the patterned retardation film 32. The regions A in the split-region retardation film 32 have slow axes parallel to the transmission axis of the polarizer 62, and the retardation thereof is set to be $\lambda/2$. The regions B have slow axes at a relative angle of 45° to the transmission axis of the polarizer 62, and the retardation thereof is set to be $\lambda/2$. The patterned retardation film 32 in which the regions A and B are thus distributed can be formed of, for example, a liquid crystal film in which liquid crystal polymers are arranged and solidified so that regions A and B have different alignment axes.

Referring again to FIG. 1, the control liquid crystal device 3 is provided on the display side of the retardation substrate 30. The control liquid crystal device 3 includes a back-side substrate 40 and a display-side substrate 50 opposing each other. The back-side substrate 40 has a glass substrate 41 as a base material, and the display-side substrate 50 has a glass substrate 51 as a base material. A liquid crystal layer 65 is provided between the back-side substrate 40 and the display-side substrate 50. Electrodes 49 and 59 formed of ITO are respectively provided on almost the entire surfaces of the back-side substrate 40 and the display-side substrate 50 facing the liquid crystal layer 65. By applying a voltage between the electrodes 49 and 59, an electric field can be produced in the liquid crystal layer 65 so as to drive the liquid crystal layer 65. An alignment film (not shown) formed of polyimide is provided on each of the surfaces of the electrodes 49 and 59 facing the liquid crystal layer 65.

In the first exemplary embodiment, the liquid crystal layer 65 exhibits homogeneous alignment, and liquid crystal molecules in the liquid crystal layer 65 are aligned parallel to the substrate surface when a voltage is not applied. In this state, the alignment axis and retardation of the liquid crystal layer 65 are set so as to provide a phase difference of $\lambda/2$ to linearly polarized light having a polarization axis parallel or perpendicular to the transmission axis of the polarizer 62. This alignment state corresponds to a second alignment state in the invention. Hereinafter, this state of the control liquid crystal device 3 will also be referred to as an off state.

When a driving voltage is applied to the liquid crystal layer 65 via the electrodes 49 and 59, the liquid crystal molecules stand perpendicularly to the substrate surface, and a phase difference is not provided to the linearly polarized light having a polarization axis parallel or perpendicular to the transmission axis of the polarizer 62. This alignment state corresponds to a first alignment state in the invention. Hereinafter, this state of the control liquid crystal device 3 will also be referred to as an on state.

As described above, in the control liquid crystal device 3, the alignment state of the liquid crystal layer 65 can be switched between the first alignment state and the second alignment state by switching the application of the driving voltage.

In this specification, the expression that the retardation is $\lambda/2$ or the expression that a phase difference of $\lambda/2$ is provided means not only that a phase difference of $\lambda/2$ is strictly provided to incident light, but also means that a phase difference of $\lambda/2$ is provided to light having a wavelength $\lambda$ in the visible region.

The polarizer 63 is provided on the display side of the control liquid crystal device 3, and has a transmission axis parallel to the transmission axis of the polarizer 62.

B. Operation and Driving Method of Electrooptic Device

The operation and driving method of the above-described liquid crystal display device 1 serving as the electrooptic device will now be described with reference to FIGS. 4 to 9. The liquid crystal display device 1 can simultaneously display different images in different directions (two-screen display) by shielding a part of display light emitted from the liquid crystal panel 2 by the function of the barrier mask 4. A description will be given below of the principle of light shielding by the barrier mask 4 and the principle of two-screen display realized by the light shielding.

Figure 4A:
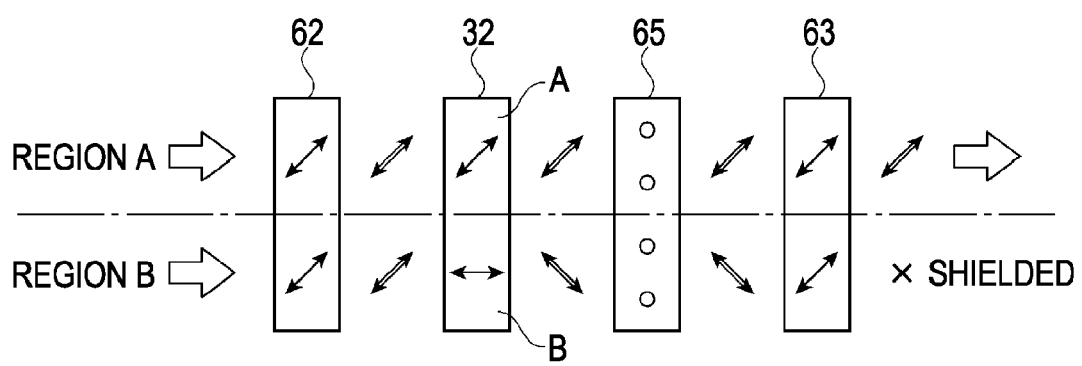

FIG. 4A is a schematic view showing polarization states of display light passing through portions corresponding to regions A and B of the patterned retardation film 32 when the control liquid crystal device 3 is on. More specifically, FIG. 4A shows polarization states of display light passing through the polarizer 62, the patterned retardation film 32, the liquid crystal layer 65 of the control liquid crystal device 3, and the polarizer 63. In this figure, the polarization axis of display light and the optical axis of each component are viewed in the +Z-direction in FIG. 1. The polarization axis is shown by a double-line arrow, and the optical axis is shown by a single-line arrow.

Display light incident on a portion corresponding to a region A enters the polarizer 62, and only a polarized component parallel to the transmission axis of the polarizer 62 passes as linearly polarized light through the polarizer 62. The linearly polarized light then enters the patterned retardation film 32. Since the slow axis in the region A of the patterned retardation film 32 is parallel to the transmission axis of the polarizer 62, the incident linearly polarized light is not provided with a phase difference. Therefore, the incident light remains linearly polarized light without changing its polarization axis, and passes through the patterned retardation film 32. Subsequently, the linearly polarized light enters the liquid crystal layer 65. Since the control liquid crystal device 3 is on, the liquid crystal molecules in the liquid crystal layer 65 are aligned perpendicularly to the substrate surface, and a phase difference is not provided to the incident linearly polarized light by the liquid crystal layer 65. Therefore, the incident light remains linearly polarized light without changing its polarization axis, and passes through the liquid crystal layer 65. Finally, the linearly polarized light enters the polarizer 63. Since the transmission axis of the polarizer 65 is parallel to the transmission axis of the polarizer 62, the incident linearly polarized light is not absorbed, but passes through the polarizer 63. Therefore, the display light incident on the portion corresponding to the region A passes through the barrier mask 4, and is viewed by the viewer.

In contrast, display light incident on a portion corresponding to a region B enters the polarizer 62, and passes as linearly polarized light therethrough, similarly to the above. The linearly polarized light then enters the patterned retardation film 32. Since the slow axis in the region B of the patterned retardation film 32 is at an angle of 45° to the transmission axis of the polarizer 62, a phase difference of $\lambda/2$ is provided to the incident linearly polarized light, is converted into linearly polarized light having a polarization axis orthogonal to the polarization axis provided at the incidence on the patterned retardation film 32, and then passes through the region B. Subsequently, the linearly polarized light enters the liquid crystal layer 65. Since the control liquid crystal device 3 is on, a phase difference is not provided to the incident linearly polarized light by the liquid crystal layer 65. The incident light remains linearly polarized light without changing its polarization axis, and passes through the liquid crystal layer 65. Finally, the linearly polarized light enters the polarizer 63.

In this case, since the polarization axis of the incident light and the transmission axis of the polarizer 63 are orthogonal to each other, the incident light is absorbed by the polarizer 63. Therefore, the display light incident on the portion corresponding to the region B is shielded by the barrier mask 4, and is not viewed by the viewer.

Figure 4B:
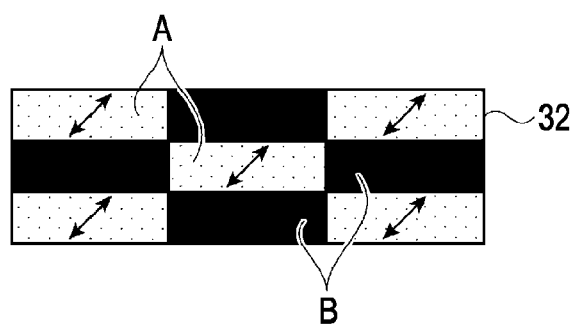
FIG. 4B is a schematic view showing a shape of a parallax barrier provided at the patterned retardation film.

In this way, when the control liquid crystal device 3 is in an on state, only the display light passing through the regions B is shielded. As a result, the viewer visually recognizes as if a parallax barrier having a shape shown in FIG. 4B is formed at the patterned retardation film 32 in the barrier mask 4. That is, the viewer visually recognizes as if a parallax barrier (step barrier) having an oblong checkered pattern is formed corresponding to the distribution of the regions B.

Figure 5A:
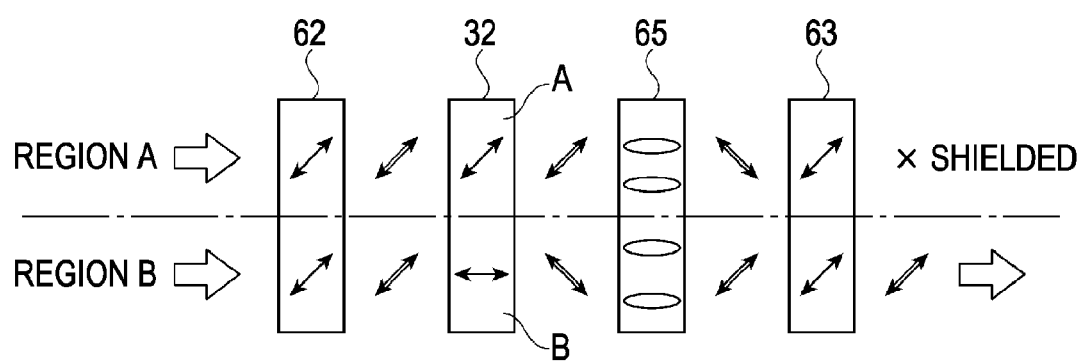
FIG. 5A is a schematic view showing a polarization state of display light passing through the portions corresponding to the regions A and B of the patterned retardation film when the control liquid crystal device is off.
Figure 5B:
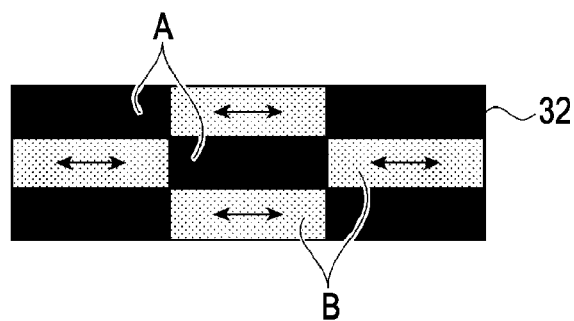
FIG. 5B is a schematic view showing a shape of a parallax barrier provided at the patterned retardation film.

Light shielding performed when the control liquid crystal device 3 is off will now be described with reference to FIGS. 5A and 5B. FIG. 5A is a schematic view showing polarization states of display light passing through portions corresponding to the regions A and B of the patterned retardation film 32 when the control liquid crystal device 3 is off.

Display light incident on a portion corresponding to a region A of the patterned retardation film 32 enters the polarizer 62, and linearly polarized light passes through the polarizer 62, similarly to the above. The linearly polarized light then enters the region A, and passes therethrough without changing its polarization axis. Subsequently, the linearly polarized light enters the liquid crystal layer 65. Since the control liquid crystal device 3 is off, the liquid crystal molecules in the liquid crystal layer 65 are aligned parallel to the substrate surface, and a phase difference of $\lambda/2$ is provided to the incident linearly polarized light by the liquid crystal layer 65. Therefore, the incident light is converted into linearly polarized light having a polarization axis orthogonal to the polarization axis provided at the incidence on the liquid crystal layer 65, and passes through the liquid crystal layer 65. Finally, the linearly polarized light enters the polarizer 63. In this case, since the polarization axis of the incident light and the transmission axis of the polarizer 63 are orthogonal to each other, the incident light is absorbed by the polarizer 63. Therefore, the display light incident on the portion corresponding to the region A is shielded by the barrier mask 4, and is not viewed by the viewer.

In contrast, display light incident on a portion corresponding to a region B of the patterned retardation film 32 enters the polarizer 62, and linearly polarized light passes through the polarizer 62, similarly to the above. The linearly polarized light then enters the region B. In the region B, the linearly polarized light is provided with a phase difference of $\lambda/2$, as described above, is converted into linearly polarized light having a polarization axis orthogonal to the polarization axis provided at the incidence on the patterned retardation film 32, and then passes through the region B. Subsequently, the linearly polarized light enters the liquid crystal layer 65. Since the control liquid crystal device 3 is off, the incident linearly polarized light is provided with a phase difference of $\lambda/2$ by the liquid crystal layer 65. Therefore, the incident light is converted again into linearly polarized light having a polarization axis orthogonal to the polarization axis at the incidence on the liquid crystal layer 65, and passes through the liquid crystal layer 65. That is, the linearly polarized light has a polarization axis parallel to the transmission axis of the first polarizer 62. Finally, the linearly polarized light enters the polarizer 63. Since the transmission axis of the polarizer 63 is parallel to the transmission axis of the polarizer 62, the incident light is not absorbed, but passes through the polarizer 63.

Therefore, the display light incident on the portion corresponding to the region B passes through the barrier mask 4, and is viewed by the viewer.

In this way, when the control liquid crystal device 3 is off, only display light passing through the regions A is shielded. As a result, the viewer visually recognizes as if a parallax barrier having a shape shown in FIG. 5B is formed at the patterned retardation film 32 in the barrier mask 4. That is, the viewer recognizes as if a parallax barrier (step barrier) having an oblong checkered pattern is formed corresponding to the distribution of the regions A.

As described above, the regions B are shielded when the control liquid crystal device 3 is on, and the regions A are shielded when the control liquid crystal device 3 is off. Comparison between FIG. 4B and FIG. 5B shows that the parallax barrier formed at the patterned retardation film 32 can be reversed by switching the on/off state of the control liquid crystal device 3. Herein, an on state of the control liquid crystal device 3 corresponds to a first state in the invention, and an off state of the control liquid crystal device 3 corresponds to a second state in the invention.

A description will now be given of displays performed by the liquid crystal display device 1 when the control liquid crystal device 3 is on and off. FIGS. 6 and 7 are schematic views showing displays on the liquid crystal display device 1, respectively, when the control liquid crystal device 3 is on and off.

Figure 6A:
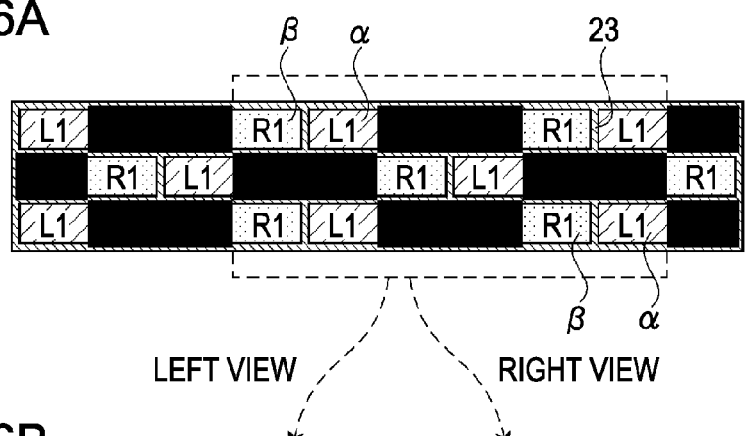

FIG. 6A is a plan view of the liquid crystal display device 1 (FIG. 1), as viewed from the display side when the control liquid crystal device 3 is on. When the control liquid crystal device 3 is on, an image L1 is displayed using pixels α of the liquid crystal panel 2, and an image R1 is displayed using pixels β. Herein, the image L1 and the image R1 respectively correspond to a first image and a second image in the invention. Since the right half of each pixel α and the left half of each pixel β are shielded by a portion of the parallax barrier formed in the region B, when the liquid crystal display device 1 is viewed from the display side, the image L1 displayed using the left half of each pixel α and the image R1 displayed using the right half of each pixel β are visible.

Figure 6B:
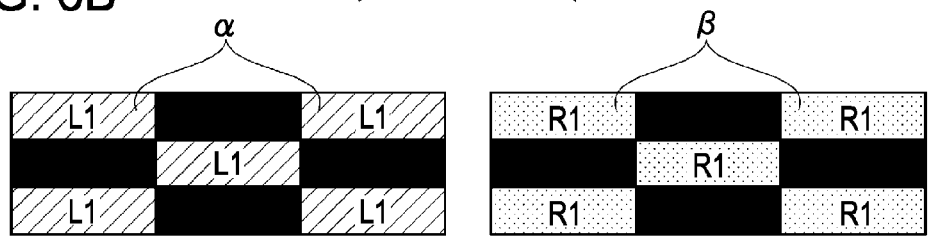
FIG. 6B is a schematic view showing displays viewed by a viewer when the viewing angle is tilted to the right and left.
Figure 6C:
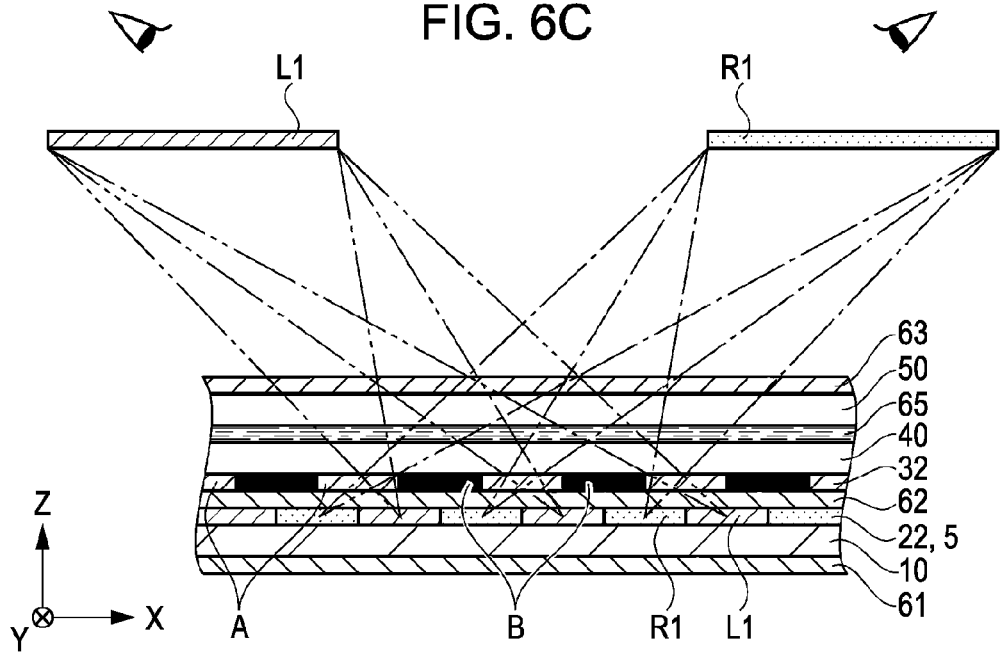
FIG. 6C is a cross-sectional view showing the principal of the displays.

FIG. 6B shows displays viewed by the viewer when the viewing angle is tilted to the right and left in this state. FIG. 6C is a cross-sectional view showing the principle of the displays. When the viewing angle is tilted to the left (that is, in the −X-direction), the image R1 displayed by the pixels β is shielded by the parallax barrier, and is not visible, and only the image L1 displayed by the pixels α is visible, as shown in FIG. 6C. In contrast, when the viewing angle is tilted to the right (that is, in the +X-direction), the image L1 displayed by the pixels α is shielded by the parallax barrier, and is not visible, and only the image R1 displayed by the pixels β is visible. Therefore, when the viewing angle is tilted to the left, the image L1 displayed by the pixels α is viewed from the apertures of the parallax barrier, as shown in the left part of FIG. 6B. Similarly, when the viewing angle is tilted to the right, the image R1 displayed by the pixels β is viewed from the apertures of the parallax barrier, as shown in the right part of FIG. 6B.

In order to adjust the viewing angle at which the pixels to be shielded are switched, as described above, the distance between the color filters 22 (FIG. 1), from which display light is substantially emitted, and the patterned retardation film 32, in which the parallax barrier is formed, is changed in accordance with the arrangement pitch of the pixels α and β in the X-axis direction. In the first exemplary embodiment, the arrangement pitch of the pixels α and β in the X-axis direction is set at about 200 μm, and the distance between the color filters 22 and the patterned retardation film 32 is set at about 190 μm (the glass substrate 21 is about 50 μm in thickness, and the polarizer 62 is about 140 μm in thickness). In order to increase the angle at which the pixels to be shielded are switched, the distance between the color filters 22 and the patterned retardation film 32 is decreased. Conversely, in order to decrease the angle, the distance is increased.

Figure 7A:
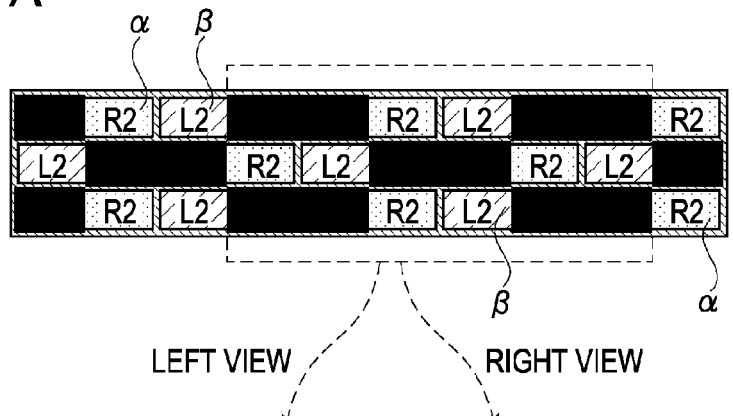
FIG. 7A is a schematic plan view showing a display of the liquid crystal display device when the control liquid crystal device is off.

FIG. 7A is a plan view of the liquid crystal display device 1 (FIG. 1), as viewed from the display side when the control liquid crystal device 3 is off. When the control liquid crystal device 3 is off, an image R2 is displayed using pixels α of the liquid crystal panel 2, and an image L2 is displayed using pixels β. Herein, the image L2 and the image R2 are the same as the above-described images L1 and R1, and respectively correspond to the first image and the second image in the invention. Since the left half of each pixel α and the right half of each pixel β are shielded by a portion of the parallax barrier formed in the region A, when the liquid crystal display device 1 is viewed from the display side, the image R2 displayed using the right half of each pixel α and the image L2 displayed using the left half of each pixel β are visible.

Figure 7B:
FIG. 7B is a schematic view showing displays viewed by the viewer when the viewing angle is tilted to the right and left.
Figure 7C:
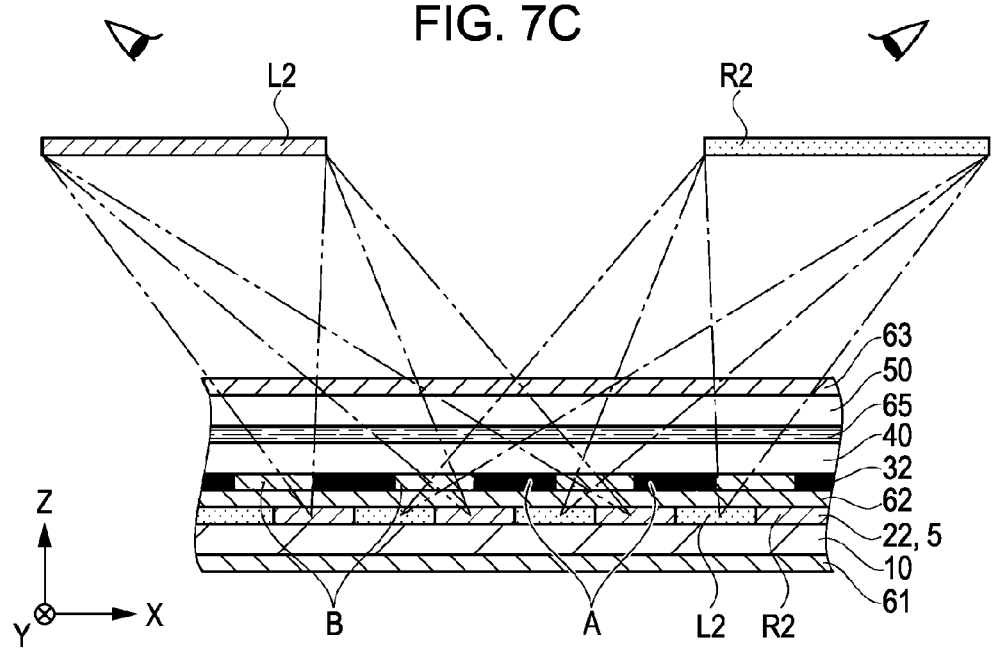
FIG. 7C is a cross-sectional view showing the principal of the displays.

FIG. 7B shows displays viewed by the viewer when the viewing angle is tilted to the right and left in this state. FIG. 7C is a cross-sectional view showing the principle of the displays. When the viewing angle is tilted to the left, the image R2 displayed by the pixels α is shielded by the parallax barrier, and is not visible, and only the image L2 displayed by the pixels β is visible, as shown in FIG. 7C. In contrast, when the viewing angle is tilted to the right, the image L2 displayed by the pixels β is shielded by the parallax barrier, and is not visible, and only the image R2 displayed by the pixels α is visible. Therefore, when the viewing angle is tilted to the left, the image L2 displayed by the pixels β is viewed from the apertures of the parallax barrier, as shown in the left part of FIG. 7B. Similarly, when the viewing angle is tilted to the right, the image R2 displayed by the pixels α is viewed from the apertures of the parallax barrier, as shown in the right part of FIG. 7B.

In the liquid crystal display device 1, switching can be made between the display state shown in FIG. 6 and the display state shown in FIG. 7 by switching the on/off state of the control liquid crystal device 3. FIGS. 8A and 8B show displays viewed when the state of the control liquid crystal device 3 is switched.

From the left viewing, the viewer views displays shown in FIG. 8A. That is, when the control liquid crystal device 3 is on, a color image L1 displayed by the pixels α including pixels 5r, 5g, and 5b is visible. When the control liquid crystal device 3 is off, a color image L2 displayed by the pixels β including pixels 5r, 5g, and 5b is visible. By switching the on/off state of the control liquid crystal device 3 at high speed, these displays are viewed while being superimposed (the lowermost part of FIG. 8A), and the images L1 and L2 (that is, first images in the invention) are displayed by all the pixels α and β.

In contrast, from the right viewing, the viewer views displays shown in FIG. 8B. That is, when the control liquid crystal device 3 is on, a color image R1 displayed by the pixels β including pixels 5r, 5g, and 5b is visible. When the control liquid crystal device 3 is off, a color image R2 displayed by the pixels α including pixels 5r, 5g, and 5b is visible. By switching the on/off state of the control liquid crystal device 3 at high speed, these displays are viewed while being superimposed (the lowermost part of FIG. 8B), and the images R1 and R2 (that is, second images in the invention) are displayed by all the pixels α and β.

In the liquid crystal display device 1 according to the first exemplary embodiment, the first and second images can be simultaneously displayed at the left viewing angle and the right viewing angle in this way. While the display images are partly shielded by the parallax barrier at each moment, all the pixels α and β can contribute to the right and left image displays by reversing the images displayed by the pixels α and β while reversing the parallax barrier at high speed. For this reason, a high-quality two-screen display can be performed while preventing the resolution from being reduced by the parallax barrier.

Figure 9:
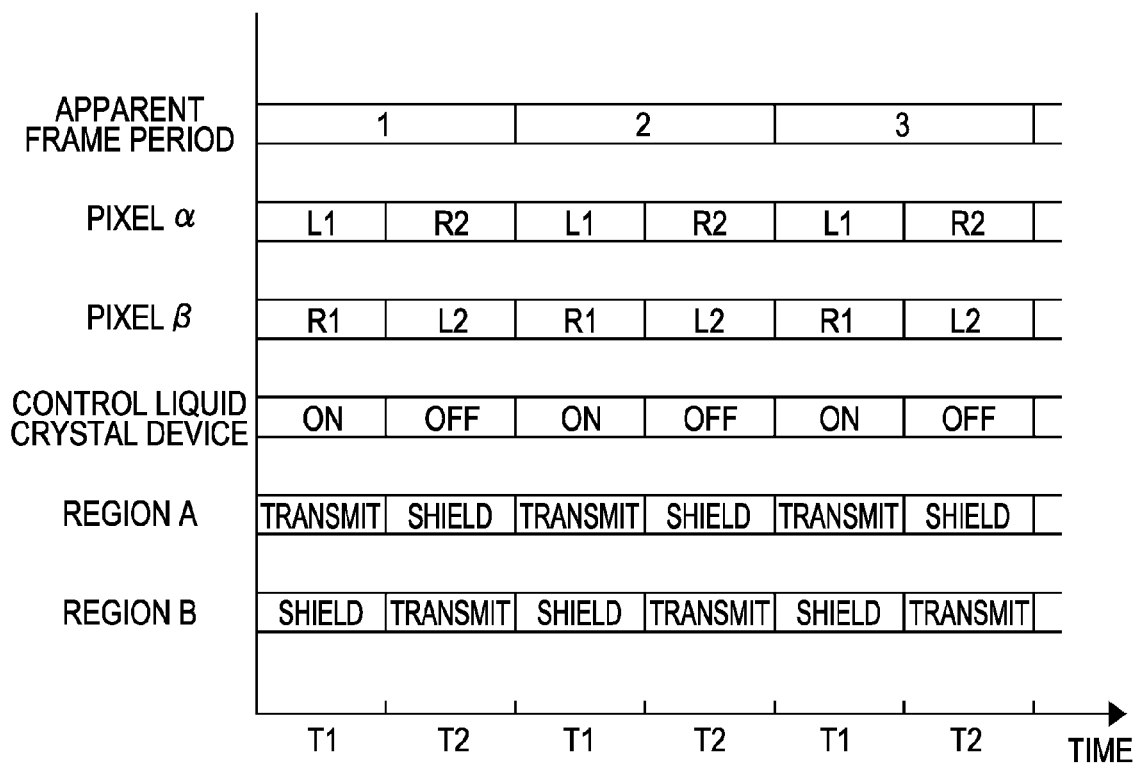
FIG. 9 is a time chart showing a driving method for the liquid crystal display device.

FIG. 9 is a time chart showing a method for driving the above-described liquid crystal display device 1. Referring to FIG. 9, the control liquid crystal device 3 is on for a time period T1, and is off for a time period T2. Regarding regions A and B, "TRANSMIT" means a state in which display light is transmitted, and "SHIELD" means a state in which display light is shielded. These states "TRANSMIT" and "SHIELD" are associated with the on and off states of the control liquid crystal device 3. The pixels α and β appropriately display images L1, L2, R1, and R2 in response to switching between the time periods T1 and T2, that is, in accordance with the on/off state of the control liquid crystal device 3, as described above. During driving of the liquid crystal display device 1, the time periods T1 and T2 are repeated at a fixed frequency.

A combination of the time periods T1 and T2 corresponds to the apparent frame period in the display of the liquid crystal display device 1. Therefore, the repetition frequency of the time periods T1 and T2 corresponds to double the apparent frame frequency in the display of the first and second images by the liquid crystal display device 1. Each apparent frame period 1, 2, 3, . . . includes a section in which the pixels α and β display first images (images L1 and L2). Therefore, all the pixels contribute to the display of the first images. Similarly, each apparent frame period 1, 2, 3, . . . includes a section in which the pixels α and β display second images (images R1 and R2). Therefore, all the pixels also contribute to the display of the second images.

For example, when the apparent frame frequency in the display of the liquid crystal display device 1 is 30 frames per second, the repetition frequency of the time periods T1 and T2 is set at 60 per second. By thus switching the on/off state of the control liquid crystal device 3 at high speed, the viewer visually recognizes as if first and second images are displayed by all the pixels α and β. For this reason, all the pixels α and β contribute to the display of right and left images. Consequently, a high-quality two-screen display can be performed while preventing the resolution from being reduced by the parallax barrier.

Since the regions A and B are arranged in a mosaic pattern in the first exemplary embodiment, a mosaic-shaped parallax barrier (step barrier) is formed at the patterned retardation film 32. Therefore, regardless of whether the control liquid crystal device 3 is on or off, reduction in the resolution of the display of the first and second images can be suppressed more than in a case in which a striped barrier is used. Consequently, a high-quality two-screen display can be performed even when the on/off switching frequency of the control liquid crystal device 3 is low.

Second Exemplary Embodiment

A second exemplary embodiment of the invention will now be described. In a liquid crystal display device 1 according to the second exemplary embodiment, regions A and B of a patterned retardation film 32 are arranged in stripes, unlike the first exemplary embodiment in which the regions A and B are arranged in a mosaic pattern. In the following, differences from the first exemplary embodiment will be principally described, and descriptions of components common to the first exemplary embodiment will be omitted.

Figure 10A:
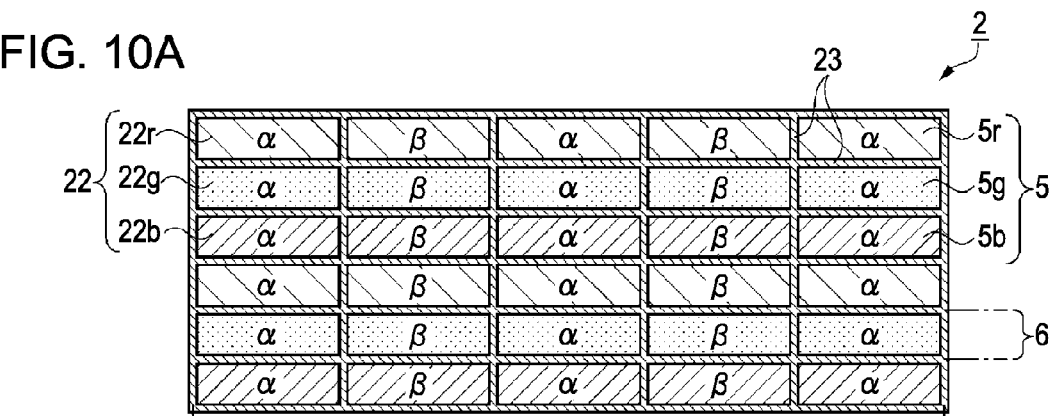
FIG. 10A is a plan view of a liquid crystal panel, as viewed from the display side according to a second exemplary embodiment of the invention.

FIG. 10A is a plan view of a liquid crystal panel 2, as viewed from the display side. In the second exemplary embodiment, pixels α and pixels β are alternately arranged in the X-axis direction, and the same pixels are arranged in line in the Y-axis direction. That is, the pixels α and pixels β are arranged to form stripes.

Figure 10B:
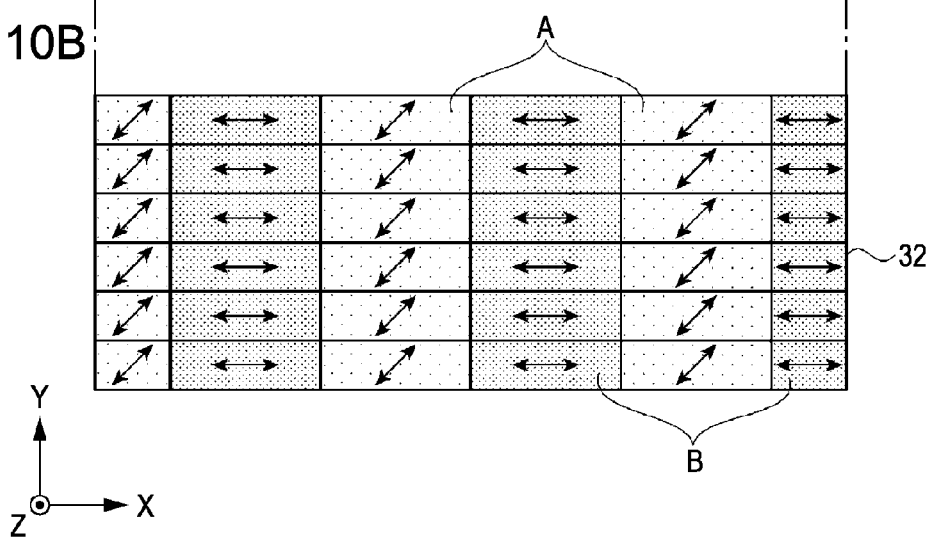
FIG. 10B is a plan view of a patterned retardation film, as viewed from the display side.

FIG. 10B is a plan view of the patterned retardation film 32, as viewed from the display side, and shows a portion that coincides with the liquid crystal panel 2 shown in FIG. 10A, as viewed in the +Z-direction. In the second exemplary embodiment, the regions A and B are also aligned with pixel rows 6 in the Y-axis direction, and are alternately arranged in the X-axis direction so as to be shifted by half of the arrangement pitch of the pixels α and pixels β with respect to the pixels α and pixels β. More specifically, each region A is provided on the left half of a pixel α and the right half of a pixel β, and each region B is placed on the left half of a pixel β and the right half of a pixel α. Therefore, the regions A and B are alternately arranged in the X-axis direction, and are arranged to form stripes in the Y-axis direction.

Figure 11A:
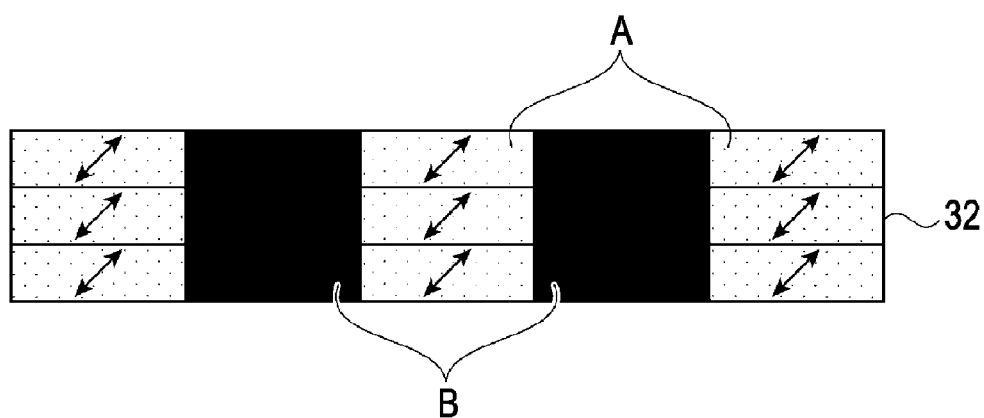
Figure 11B:
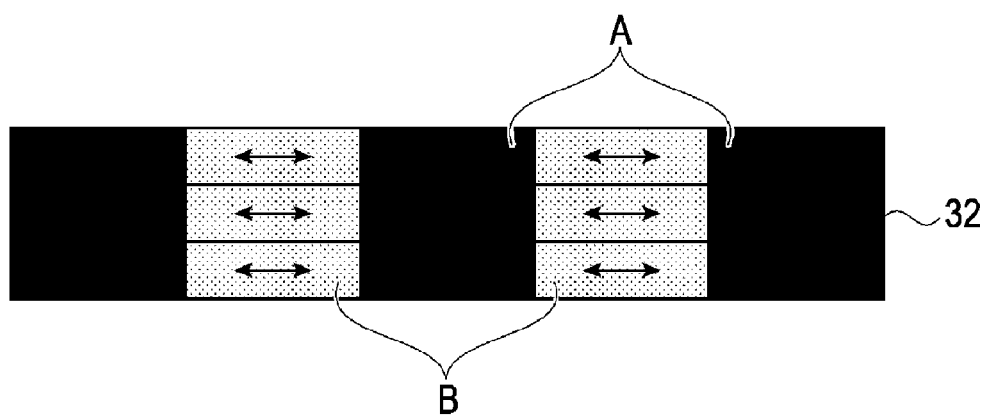
FIG. 11B is a schematic view showing a shape of a parallax barrier provided at the patterned retardation film when the control liquid crystal device is off.

Similarly to the first exemplary embodiment, the regions A and B serve as a parallax barrier so as to switch between a state to transmit incident light and a state to shield the light in accordance with the on/off state of a control liquid crystal device 3. FIGS. 11A and 11B show the shape of the parallax barrier formed at the patterned retardation film 32. FIG. 11A shows a shape of a parallax barrier formed when the control liquid crystal device 3 is on, and FIG. 11B shows a shape of a parallax barrier formed when the control liquid crystal device 3 is off. That is, when the control liquid crystal device 3 is on, display light incident on the regions B of the patterned retardation film 32 are shielded, and only display light incident on the regions A are transmitted, as shown in FIG. 11A. Similarly, when the control liquid crystal device 3 is off, display light incident on the regions A are shielded, and only display light incident on the regions B are transmitted, as shown in FIG. 11B. Since the regions A and B are arranged in stripes, the formed parallax barrier also has a stripe pattern. Comparison between FIGS. 11A and 11B shows that the parallax barrier formed at the patterned retardation film 32 can be reversed by switching the on/off state of the control liquid crystal device 3.

A description will now be given of displays performed by the liquid crystal display device 1 when the control liquid crystal device 3 is on and off. FIGS. 12 and 13 are schematic views showing displays performed by the liquid crystal display device 1, respectively, when the control liquid crystal device 3 is on and off.

Figure 12A:
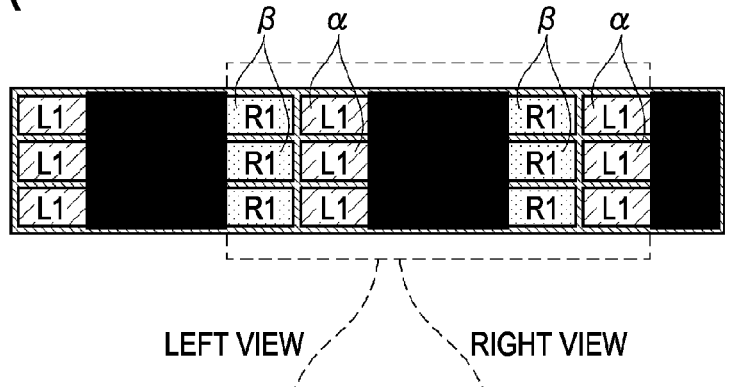

FIG. 12A is a plan view of the liquid crystal display device 1 (FIG. 1) when the control liquid crystal device 3 is on, as viewed from the display side. When the control liquid crystal device 3 is on, an image L1 is displayed using pixels α of the liquid crystal panel 2, and an image R1 is displayed using pixels β. Herein, the image L1 and the image R1 correspond to a first image and a second image in the invention, respectively. Since the right half of each pixel α and the left half of each pixel β are shielded by a portion of the parallax barrier formed in the region B, the image L1 displayed using the left half of each pixel α and the image R1 displayed using the right half of each pixel β are visible when the liquid crystal display device 1 is viewed from the display side.

Figure 12B:
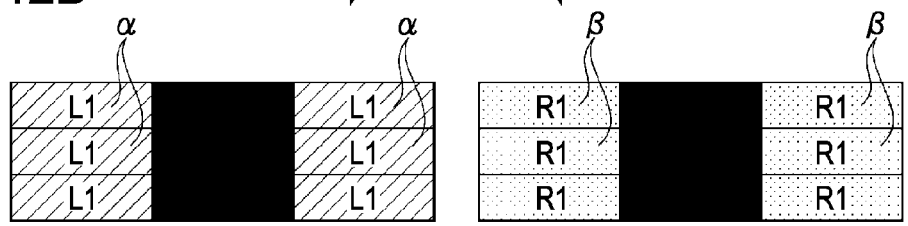
FIG. 12B is a schematic view showing displays viewed by the viewer when the viewing angle is tilted to the right and left.

FIG. 12B shows displays viewed by the viewer when the viewing angle is tilted to the right and left in this state. When the viewing angle is tilted to the left, the image R1 displayed by the pixels β is shielded by the parallax barrier and is not visible, and only the image L1 displayed by the pixels α is visible, as shown in FIG. 6C. In contrast, when the viewing angle is titled to the right, the image L1 displayed by the pixels α is shielded by the parallax barrier and is not visible, and only the image R1 displayed by the pixels β is visible. Therefore, when the viewing angle is tilted to the left, the image L1 displayed in stripes by the pixels α is viewed from the apertures of the parallax barrier, as shown in the left part of FIG. 12B. Similarly, when the viewing angle is tilted to the right, the image R1 displayed in stripes by the pixels β is viewed from the apertures of the parallax barrier, as shown in the right part of FIG. 12B.

Figure 13A:
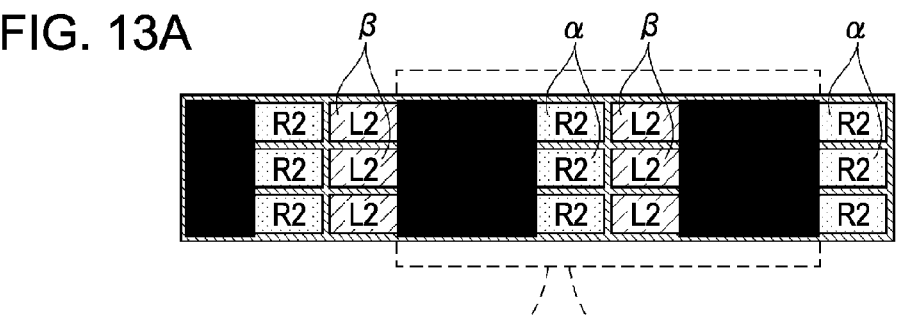

FIG. 13A is a plan view of the liquid crystal display device 1 when the control liquid crystal device 3 is off, as viewed from the display side. When the control liquid crystal device 3 is off, an image R2 is displayed using the pixels α of the liquid crystal panel 2, and an image L2 is displayed using the pixels β. Since the left half of each pixel α and the right half of each pixel β are shielded by a portion of the parallax barrier formed in the region B, an image R2 displayed using the right half of each pixel α and an image L2 displayed using the left half of each pixel β are visible when the liquid crystal display device 1 is viewed from the display side.

Figure 13B:
FIG. 13B is a schematic view showing displays viewed by the viewer when the viewing angle is tilted to the right and left.

FIG. 13B shows displays viewed by the viewer when the viewing angle is tilted to the right and left in this state. When the viewing angle is tilted to the left, the image R2 displayed by the pixels α is shielded by the parallax barrier and is not visible, and only the image L2 displayed by the pixels β is visible, as shown in FIG. 7C. In contrast, when the viewing angle is titled to the right, the image L2 displayed by the pixels β is shielded by the parallax barrier and is not visible, and only the image R2 displayed by the pixels α is visible. Therefore, when the viewing angle is tilted to the left, the image L2 displayed in stripes by the pixels β is viewed from the apertures of the parallax barrier, as shown in the left part of FIG. 13B. Similarly, when the viewing angle is tilted to the right, the image R2 displayed in stripes by the pixels α is viewed from the apertures of the parallax barrier, as shown in the right part of FIG. 13B.

In the second exemplary embodiment, switching between the display state shown in FIG. 12 and the display state shown in FIG. 13 can also be made by switching the on/off state of the control liquid crystal device 3. FIG. 14 shows displays viewed when the state of the control liquid crystal device 3 is switched.

From the left viewing angle, the viewer views displays shown in FIG. 14A. That is, when the control liquid crystal device 3 is on, the viewer views a color image L1 displayed by the pixels α including pixels 5r, 5g, and 5b. When the control liquid crystal device 3 is off, the viewer views a color image L2 displayed by the pixels β including pixels 5r, 5g, and 5b. By switching the on/off state of the control liquid crystal device 3 at high speed, these displays are viewed while being superimposed (the lowermost part of FIG. 14A), and the images L1 and L2 (that is, first images in the invention) are displayed by all the pixels α and β.

From the right viewing, the viewer views displays shown in FIG. 14B. That is, when the control liquid crystal device 3 is on, the viewer views a color image R1 displayed by the pixels β including pixels 5r, 5g, and 5b. When the control liquid crystal device 3 is off, the viewer views a color image R2 displayed by the pixels α including pixels 5r, 5g, and 5b. By switching the on/off state of the control liquid crystal device 3 at high speed, these displays are viewed while being superimposed (the lowermost part of FIG. 14B), and the images R1 and R2 (that is, second images in the invention) are displayed by all the pixels α and β.

In the second exemplary embodiment, the first and second images can also be simultaneously displayed at the left viewing angle and the right viewing angle, respectively, in this way. While the display images are partly shielded by the parallax barrier at each moment, all the pixels α and β can contribute to the right and left image displays by reversing the images displayed by the pixels α and β while reversing the parallax barrier at high speed. For this reason, a high-quality two-screen display can be performed while preventing the resolution from being reduced by the parallax barrier.

Further, the regions A and B of the patterned retardation film 32 are arranged in stripes. In this case, the area of each connected unit of regions is made larger than when the regions A and B are arranged in a mosaic pattern. Therefore, variations in phase difference in the same region can be reduced. Moreover, changes in phase difference near the boundary between the regions A and B can be suppressed. Consequently, the quality of two-screen display can be improved further.

Mount Examples in Electronic Apparatuses

Figure 20:
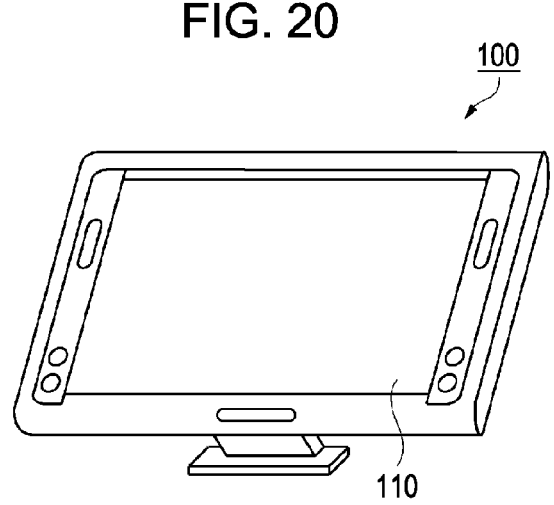
FIG. 20 is a perspective view of a display device for a car navigation system.

The above-described liquid crystal display device 1 can be mounted in, for example, a display device 100 for a car navigation system serving as an electronic apparatus shown in FIG. 20. The display device 100 can simultaneously display two images in different directions by the liquid crystal display device 1 incorporated in a display unit 110. For example, the display device 100 can display a map image on the driver's side, and a movie image on the front passenger's side. In this case, a high-quality display can be performed while preventing the resolution from being reduced by the parallax barrier.

The liquid crystal display device 1 to which the invention is applied can be used not only in the above-described display device 100, but also in various electronic apparatuses such as a mobile computer, a mobile telephone, a digital camera, a digital video camera, car-mounted equipment, and audio equipment.

While the exemplary embodiments of the invention have been described above, various modifications can be made to the embodiments without departing from the scope of the invention. The following modifications are conceivable.

First Modification

Figure 15:
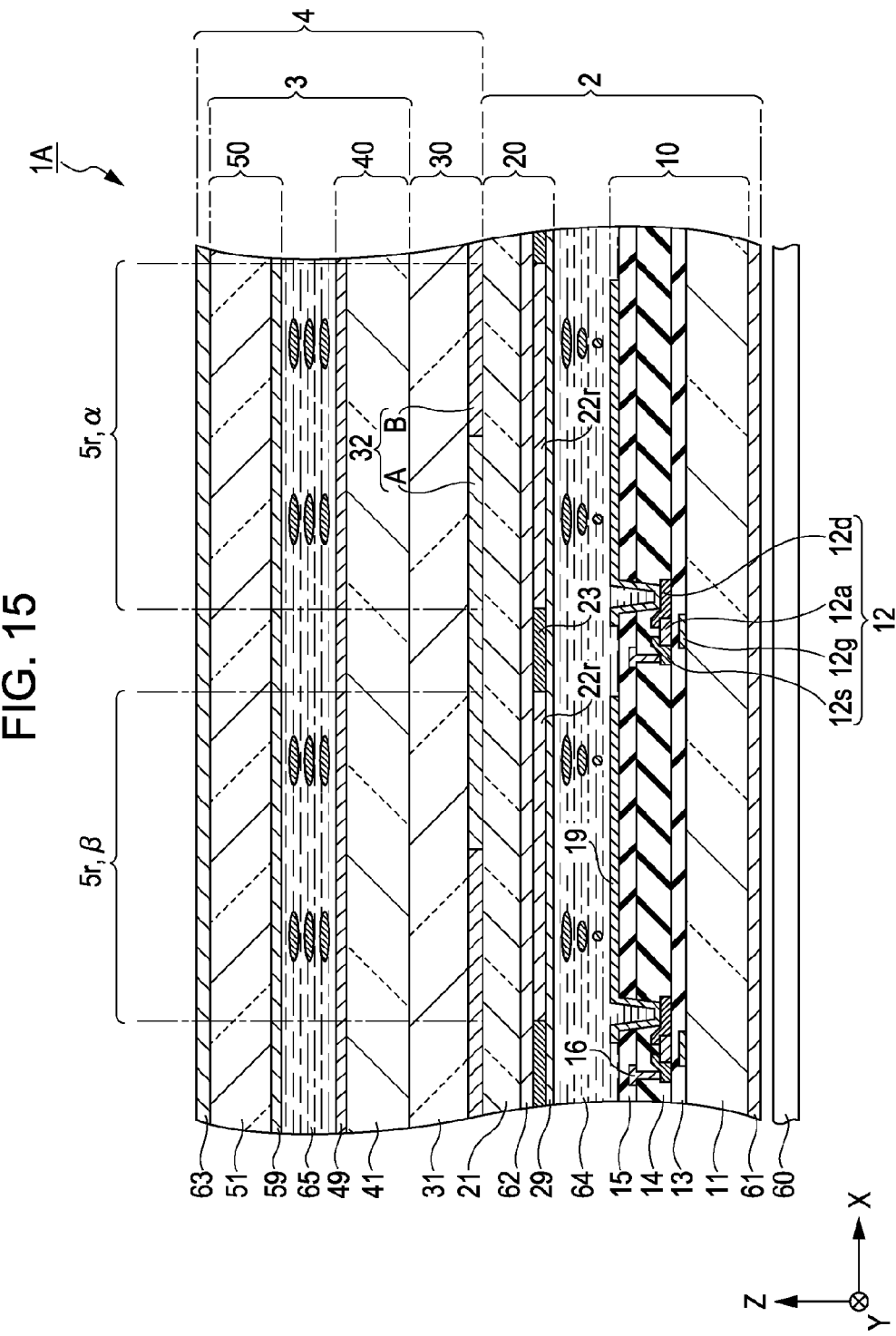
FIG. 15 is a cross-sectional view of a liquid crystal display device according to a first modification of the invention.

Unlike the above-described embodiments, a polarizer 62 can be incorporated in a counter substrate 20 of a liquid crystal panel 2. More specifically, the polarizer 62 can be provided on a surface of a glass substrate 21 facing a liquid crystal layer 64. FIG. 15 is a cross-sectional view of a liquid crystal display device 1A having the above configuration. The polarizer 62 can be, for example, a wire grid polarizer formed of a metal film having multiple fine slits. This structure can reduce the thickness of the polarizer 62. For this reason, it is possible to reduce the distance between color filters, from which display light is substantially emitted, and a patterned retardation film 32 in which a parallax barrier is formed. In this case, the relative angle between the angle at which the first image is displayed and the angle at which the second image is displayed can be increased. Alternatively, since the width of the pixels 5 in the X-axis direction can be reduced while maintaining a constant relative angle, for example, the pixels 5 can be shaped like a rectangle that is elongated in the Y-axis direction.

Figure 16:
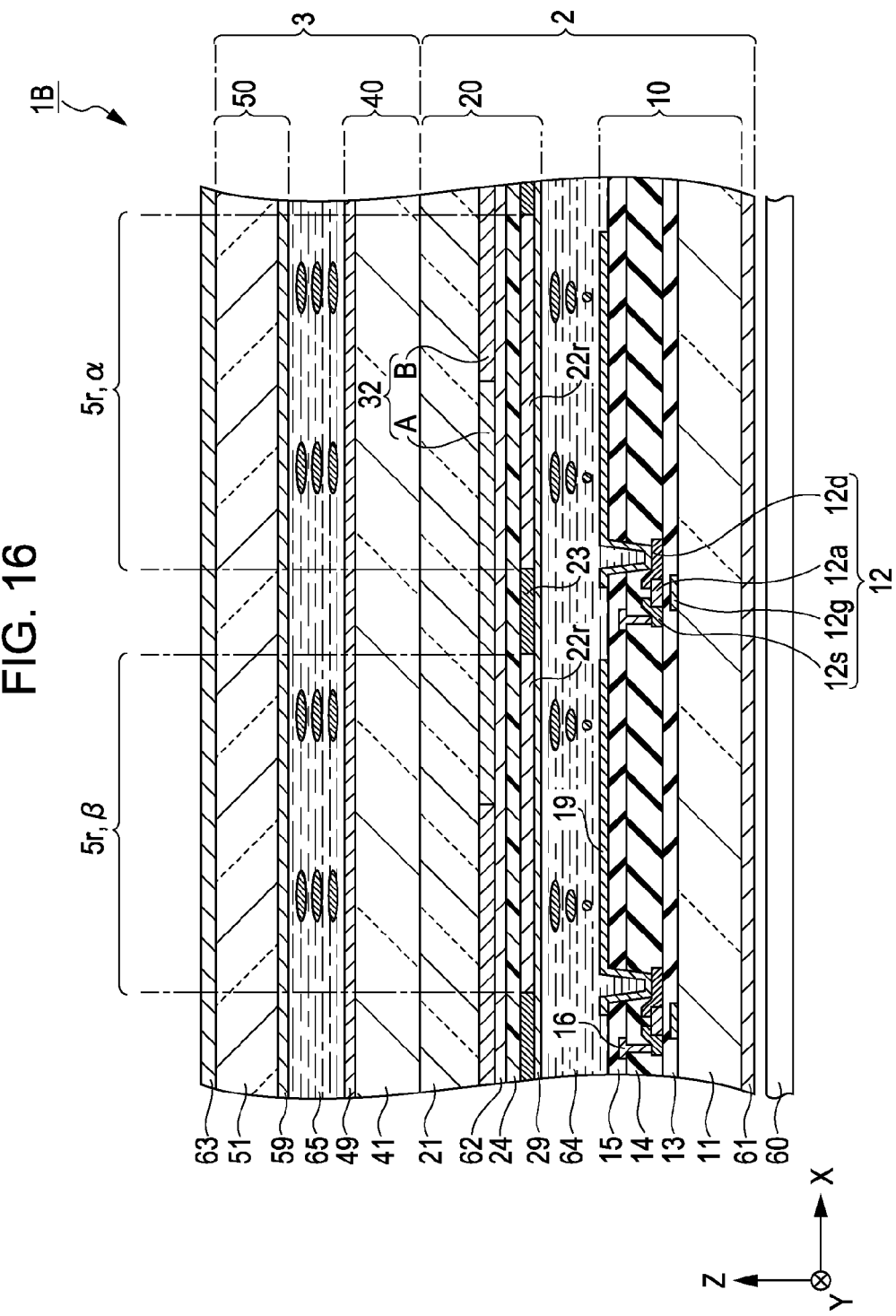
FIG. 16 is a cross-sectional view of a liquid crystal device according to the modification of the invention.

In the first modification, the patterned retardation film 32 may be provided between the glass substrate 21 and the polarizer 62. That is, the patterned retardation film 32 and the polarizer 62 may be stacked in that order on the surface of the glass substrate 21 facing the liquid crystal layer 64. FIG. 16 is a cross-sectional view of a liquid crystal display device 1B having the above structure. Since the glass substrate 31 necessary to form the patterned retardation film 32 is unnecessary, the thickness of the liquid crystal display device 1B can be reduced further. Since a glass substrate is not provided between the color filters 22, from which display light is substantially emitted, and the patterned retardation film 32 in which the parallax barrier is formed, there is no need to polish the glass substrate 21 in order to adjust the distance between the color filters 22 and the patterned retardation film 32. This can simplify the manufacturing process. If the patterned retardation film 32 and the polarizer 62 are incorporated together in the counter substrate 20, the distance between the color filters 22 and the patterned retardation film 32 sometimes becomes too short. Therefore, it is preferable to adjust the distance by placing a transmissive resin 24 between the polarizer 62 and the color filters 22.

Second Modification

Figure 17:
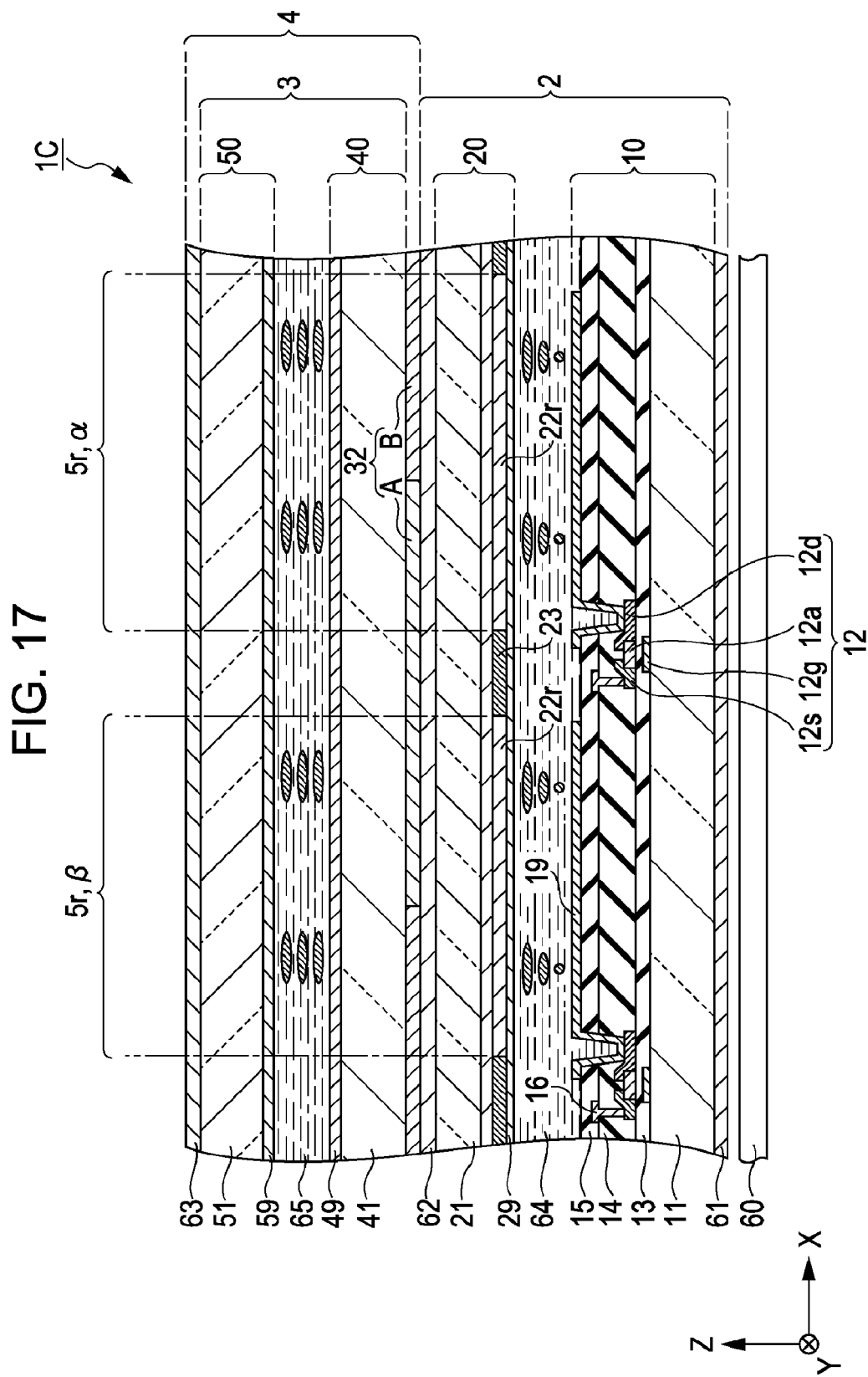
FIG. 17 is a cross-sectional view of a liquid crystal device according to a second modification of the invention.

In the above-described embodiments, the retardation substrate 30 is obtained by forming the patterned retardation film 32 on the surface of the glass substrate 31, and is disposed between the liquid crystal panel 2 and the control liquid crystal device 3. Alternatively, the patterned retardation film 32 may be formed on the surface of the back-side substrate 40 of the control liquid crystal device 3. More specifically, the patterned retardation film 32 is disposed on a surface of the glass substrate 41 of the back-side substrate 40 opposite to the liquid crystal layer 65. FIG. 17 is a cross-sectional view of a liquid crystal display device 1C having the above configuration. Since this configuration eliminates the necessity of adding the glass substrate 31 so as to form the patterned retardation film 32, the thickness of the liquid crystal display device 1C can be reduced.

Third Modification

Figure 18A:
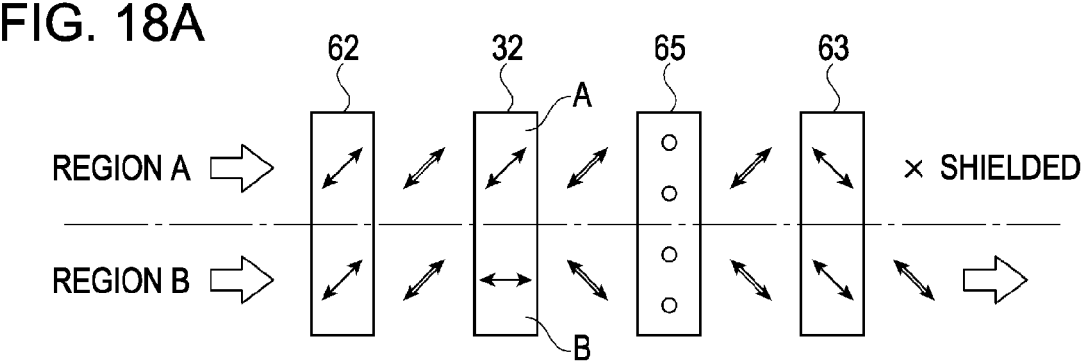
FIG. 18A is a schematic view showing a polarization state of display light passing through portions corresponding to regions A and B when a control liquid crystal device is on in a third modification of the invention.
Figure 18B:
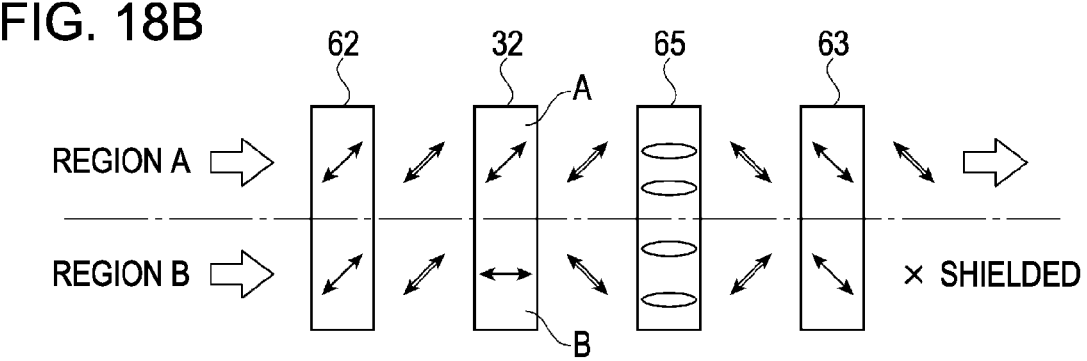
FIG. 18B is a schematic view showing a polarization state of display light passing through the portions corresponding to the regions A and B when the control liquid crystal device is off.

In the above-described embodiments, the transmission axis of the polarizer 63 is parallel to the transmission axis of the polarizer 62. Alternatively, the transmission axis of the polarizer 63 can be orthogonal to the transmission axis of the polarizer 62. FIGS. 18A and 18B are schematic views showing polarization states of display light passing through portions corresponding to regions A and B of a patterned retardation film 32. FIG. 18A shows a polarization state provided when the control liquid crystal device 3 is on, and FIG. 18B shows a polarization state provided when the control liquid crystal device 3 is off.

In the above-described embodiments, when the control liquid crystal device 3 is on, display light passes through the regions A, but is shielded by the regions B (FIG. 4A). In the third modification, since the transmission axis of the polarizer 63 is turned 90°, display light is shielded by the regions A, but passes through the regions B (FIG. 18A). Similarly, when the control liquid crystal device 3 is off, display light is shielded by the regions A, but passes through the regions B in the first exemplary embodiment (FIG. 5A). In the third modification, since the transmission axis of the polarizer 63 is turned 90°, display light passes through the regions A, but is shielded by the regions B (FIG. 18B). That is, the regions that transmit display light and the regions that shield the display light in the third modification are always the reverse of those in the above embodiments. Since this structure can also switch the portions to be shielded by switching the on/off state of the control liquid crystal device 3, a high-quality two-screen display can be performed while preventing the resolution form being reduce by the parallax barrier, because of the action similar to that of the above-described embodiments.

Fourth Modification

While the slow axes of the regions A are parallel to the transmission axis of the polarizer 62 in the above-described embodiments, they may be perpendicular thereto. In this case, display light behaves similarly to the embodiments. Therefore, a high-quality two-screen display can be performed while preventing the resolution from being reduced by the parallax barrier.

Fifth Modification

Figure 19:
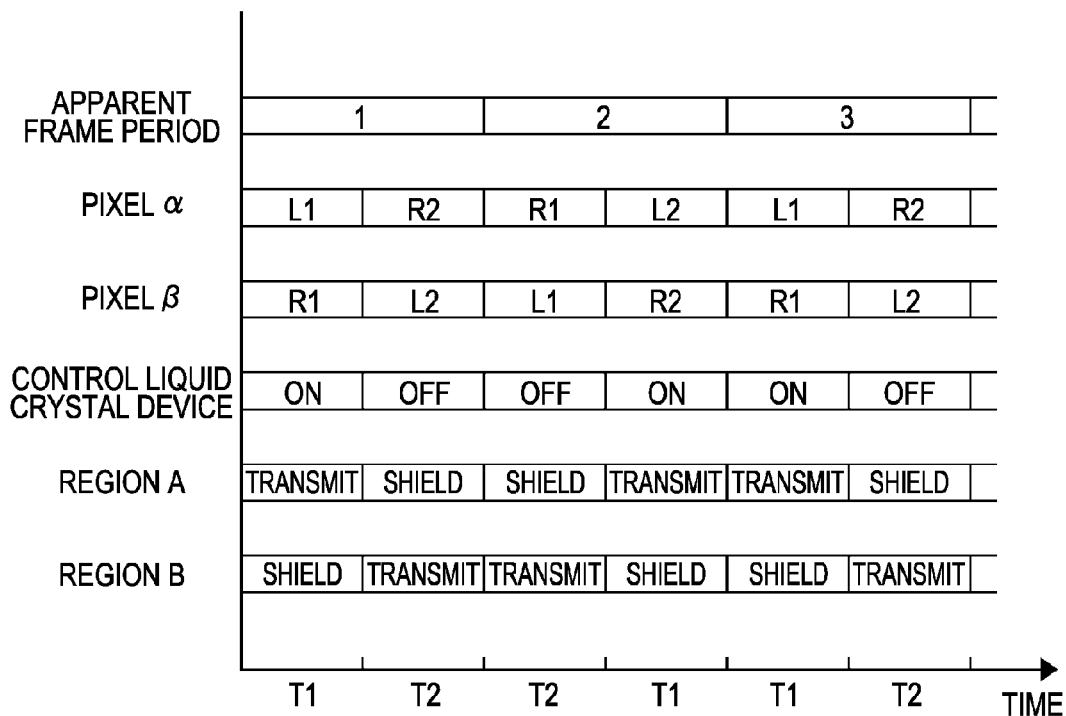
FIG. 19 is a time chart showing a driving method for a liquid crystal display device according to a fifth modification of the invention.

Instead of the driving method for the liquid crystal display device 1 adopted in the above-embodiments, driving may be performed while reversing the order of a time period T1 (first state, that is, a state in which the control liquid crystal device 3 is on) and a time period T2 (second state, that is, a state in which the control liquid crystal device 3 is off) in each apparent frame period, as shown by a time chart in FIG. 19. That is, when the control liquid crystal device 3 is switched from the on state to the off state during a certain frame period, it is switched from the off state to the on state during the next frame period. In this case, it is unnecessary to switch the alignment state of the control liquid crystal device 3 when switching the frame period. Therefore, the switching frequency of the control liquid crystal device 3 can be reduced to half the frequency adopted in the embodiments.

Sixth Modification

The mode of the liquid crystal layer 64 included in the liquid crystal panel 2 is not limited to the TN mode, and various modes, such as VA (vertical alignment), IPS (in plane switching), FFS (fringe field switching), and STN (super twisted nematic), can be adopted. Among these modes, VA, IPS, and FFS modes are preferred because they can achieve a wide viewing angle. When the liquid crystal layer 64 has a mode that achieves a wide viewing angle, the first and second images viewed at the viewing angles tilted from the normal direction of the liquid crystal panel 2 to the right and left can be displayed with high luminance and high quality.

The alignment of the liquid crystal layer 65 included in the control liquid crystal device 3 is not limited to the homogeneous alignment adopted in the above embodiments. The liquid crystal layer 65 can have any mode that can switch between a first alignment state in which a phase difference is not provided to linearly polarized light having a polarization axis parallel or perpendicular to the transmission axis of the polarizer 62 and a second alignment state in which a phase difference of $\lambda/2$ is provided thereto. For example, a TN mode or a VA mode can be adopted.

Seventh Modification

While the liquid crystal panel 2 is used as the electrooptic panel in the invention in the above-described embodiments, the electrooptic panel may be any electrooptic panel that includes a plurality of pixel rows of alternating pixels corresponding to the pixels α and β and that emits display light through a polarizer corresponding to the polarizer 62. For example, an organic EL device, a plasma display panel, and a CRT display can be adopted.

The entire disclosure of Japanese Patent Application No: 2007-006675, filed Jan. 16, 2007 is expressly incorporated by reference herein.

What is claimed is:

1. An electrooptic device that simultaneously displays a first image and a second image in different directions, the electrooptic device comprising:

an electrooptic panel including a first polarizer and a plurality of pixel rows in which first and second pixels are alternately arranged, and configured to emit light through the first polarizer;

a retardation film disposed on a display side of the first polarizer;

a liquid crystal device disposed on a display side of the retardation film and configured to switch between a first alignment state in which a phase difference is not provided to linearly polarized light having a polarization axis parallel or perpendicular to a transmission axis of the first polarizer and a second alignment state in which a phase difference of $\lambda/2$ is provided to the linearly polarized light; and a second polarizer disposed on a display side of the liquid crystal device and having a transmission axis parallel or perpendicular to the transmission axis of the first polarizer, wherein the retardation film includes first regions having a slow axis parallel or perpendicular to the transmission axis of the first polarizer and having a retardation of $\lambda/2$, and second regions having a slow axis at a relative angle of 45° to the transmission axis of the first polarizer and having a retardation of $\lambda/2$, wherein the first regions and the second regions are alternately arranged along the pixel rows while being shifted by half of an arrangement pitch of the first and second pixels with respect to the first and second pixels, as viewed in the normal direction of the electrooptic panel, wherein the first pixels display the first image when the liquid crystal layer is in the first alignment state, and display the second image when the liquid crystal layer is in the second alignment state, and wherein the second pixels display the second image when the liquid crystal layer is in the first alignment state, and display the first image when the liquid crystal layer is in the second alignment state.

2. The electrooptic device according to claim 1, wherein the first regions and the second regions are alternately arranged in a direction orthogonal to the pixel rows.

3. The electrooptic device according to claim 1, wherein each of the first regions and the second regions are connected in a direction orthogonal to the pixel rows.

4. The electrooptic device according to claim 1, wherein the electrooptic panel includes a first substrate;

a second substrate disposed on a display side of the first substrate; and an electrooptic substance provided between the first substrate and the second substrate, and wherein the first polarizer is disposed on a surface of the second substrate facing the electrooptic substance.

5. The electrooptic device according to claim 4, wherein the retardation film is provided between the second substrate and the first polarizer.

6. An electronic apparatus comprising the electrooptic device according to claim 1 in a display section.

7. An electronic apparatus comprising the electrooptic device according to claim 2 in a display section.

8. An electronic apparatus comprising the electrooptic device according to claim 3 in a display section.

9. An electronic apparatus comprising the electrooptic device according to claim 4 in a display section.

10. An electronic apparatus comprising the electrooptic device according to claim 5 in a display section.

11. An electrooptic-device driving method that drives an electrooptic device configured to simultaneously display a first image and a second image in different directions,
wherein the electrooptic device includes:
an electrooptic panel including a first polarizer and a plurality of pixel rows in which first and second pixels are alternately arranged, and configured to emit light through the first polarizer;
a retardation film disposed on a display side of the first polarizer;
a liquid crystal device disposed on a display side of the retardation film and configured to switch between a first alignment state in which a phase difference is not provided to linearly polarized light having a polarization axis parallel or perpendicular to a transmission axis of the first polarizer and a second alignment state in which a phase difference of $\lambda/2$ is provided to the linearly polarized light; and
a second polarizer disposed on a display side of the liquid crystal device and having a transmission axis parallel or perpendicular to the transmission axis of the first polarizer,
wherein the retardation film includes first regions having a slow axis parallel or perpendicular to the transmission axis of the first polarizer and having a retardation of $\lambda/2$, and second regions having a slow axis at a relative angle of 45° to the transmission axis of the first polarizer and having a retardation of $\lambda/2$,
wherein the first regions and the second regions are alternately arranged along the pixel rows while being shifted by half of an arrangement pitch of the first and second pixels with respect to the first and second pixels, as viewed in the normal direction of the electrooptic panel, and
wherein the driving method repeats, at a fixed frequency, a first state in which the liquid crystal layer is in a first alignment state, the first image is displayed by the first pixels, and the second image is displayed by the second pixels and a second state in which the liquid crystal layer is in a second alignment state, the second image is displayed by the first pixels, and the first image is displayed by the second pixels.

12. The electrooptic-device driving method according to claim 11, wherein the frequency is double an apparent frame frequency in the display of the first image and the second image performed by the electrooptic device.

* * * * *